United States Patent
Nakamura et al.

(10) Patent No.: US 7,366,066 B2
(45) Date of Patent: Apr. 29, 2008

(54) INFORMATION RECORDING METHOD AND APPARATUS, INFORMATION REPRODUCING METHOD AND APPARATUS, INFORMATION RECORDING MEDIUM, AND PROGRAM STORAGE MEDIUM WITH OVERWRITE PROTECTION FEATURES LIMITING THE POSSIBLE NUMBER OF REWRITES

(75) Inventors: Masanobu Nakamura, Tokyo (JP);
Motoki Kato, Kanagawa (JP);
Wilhelmus Jacobus Van Gestel, Heeze (NL); Kaoru Murase, Nara (JP);
Yoshiho Gotoh, Osaka (JP); Miyuki Sasaki, Osaka (JP)

(73) Assignees: Sony Corporation, Tokyo (JP);
Koninklijke Philips Electronics N.V., Eindhoven (NL); Matsushita Electric Industrial Co., Ltd., Kadoma-shi (JP)

( * ) Notice: Subject to any disclaimer, the term of this patent is extended or adjusted under 35 U.S.C. 154(b) by 218 days.

(21) Appl. No.: 10/469,510

(22) PCT Filed: Nov. 29, 2002

(86) PCT No.: PCT/JP02/12561

§ 371 (c)(1),
(2), (4) Date: Aug. 29, 2003

(87) PCT Pub. No.: WO03/046916

PCT Pub. Date: Jun. 5, 2003

(65) Prior Publication Data

US 2004/0233798 A1    Nov. 25, 2004

(30) Foreign Application Priority Data

Nov. 30, 2001 (JP) ............................ 2001-365631

(51) Int. Cl.
*G11B 7/085* (2006.01)
(52) U.S. Cl. .............................. 369/47.14; 369/53.17
(58) Field of Classification Search .................... None
See application file for complete search history.

(56) References Cited

U.S. PATENT DOCUMENTS 5,293,566 A    3/1994   Satoh et al.
5,774,742 A *  6/1998   Nakamura et al. ............. 710/8

(Continued)

FOREIGN PATENT DOCUMENTS

EP    0 871 161 A2    10/1998

(Continued)

OTHER PUBLICATIONS

Patent Abstracts of Japan, vol. 1995, No. 06, Jul. 31, 1995, JP 07 057437.

(Continued)

*Primary Examiner*—William Korzuch
*Assistant Examiner*—Joseph Haley
(74) *Attorney, Agent, or Firm*—Oblon, Spivak, McClelland, Maier & Neustadt, P.C.

(57) ABSTRACT

Congested rewriting in the same area is to be evaded to suppress the tendency towards occurrence of defective areas. When a stream 1 has been recorded, the last written address, representing the last written position, is stored. When recording a stream 2 next, recording is started directly following the position indicated by the last written address for the stream 1. The last written address, corresponding to the last address of the recording position, is stored. If the stream 2 is erased for recording a stream 3, recording is started not at a position directly following the last written address of the stream 1, but from a position directly following the last written address of the stream 2. When the stream 3 has reached the end of a recording area, the next following data is recorded as from a position directly following the stream 1.

17 Claims, 20 Drawing Sheets

U.S. PATENT DOCUMENTS

| | | |
|---|---|---|
| 6,665,690 B2 * | 12/2003 | Kimura et al. .............. 707/205 |
| 6,788,642 B2 * | 9/2004 | Hirotsune et al. ....... 369/275.3 |
| 6,992,960 B2 * | 1/2006 | Kawashima et al. ..... 369/53.22 |
| 2002/0027852 A1 * | 3/2002 | Nakane et al. ........... 369/53.17 |

FOREIGN PATENT DOCUMENTS

| | | |
|---|---|---|
| EP | 1 414 037 A1 | 4/2004 |
| JP | 4-120634 | 4/1992 |
| JP | 09-115246 | 5/1997 |
| JP | 09-167446 | 6/1997 |
| JP | 10-289524 | 10/1998 |
| JP | 11-249968 | 9/1999 |
| JP | 2001-110169 | 4/2001 |

OTHER PUBLICATIONS

Patent Abstracts of Japan, vol. 1998, No. 08, Jun. 30, 1998, JP 10 083658.

Patent Abstracts of Japan, vol. 1999, No. 08, Jun. 30, 1999, JP 11 086512.

* cited by examiner

| Directory name | File name | Allocation class |
|---|---|---|
| DVR | info.dvr | Gathered files |
| | menu.tidx | Gathered files |
| | mark.tidx | Gathered files |
| | menu.tdt1 | Gathered files |
| | menu.tdt2 | Gathered files |
| | mark.tdt1 | Gathered files |
| | mark.tdt2 | Gathered files |
| | xxxxx.rpls | Gathered files |
| | yyyyy.vpls | Gathered files |
| | zzzzz.clpi | Gathered files |
| | zzzzz.m2ts | Real-time files |
| files in directory other than DVR | | Data files |

FIG.3

| BP | Length | Name | Contents |
|---|---|---|---|
| 0 | 8 | Signature | SigRec |
| 8 | 4 | Creation Time | TimeStamp |
| 12 | 4 | Modification Time | TimeStamp |
| 16 | 2 | Sequence number | Unit16 |
| 18 | 1 | Interchange Class | Unit 8 |
| 19 | 1 | Reserved | #00 byte |
| 20 | 4 | Start Address of Main MIA | Unit32 |
| 24 | 4 | Start Address of Reserve MIA | Unit32 |
| 28 | 2 | Length of MIA | Unit16 |
| 30 | 2 | Number of MIA Map MIBs(=x) | Unit16 |
| 32 | 2x | MIA Map MIBs in Main MIA | bytes |
| 32+2x | 2x | MIA Map MIBs in Reserve MIA | bytes |

FIG.14

INFORMATION RECORDING METHOD AND APPARATUS, INFORMATION REPRODUCING METHOD AND APPARATUS, INFORMATION RECORDING MEDIUM, AND PROGRAM STORAGE MEDIUM WITH OVERWRITE PROTECTION FEATURES LIMITING THE POSSIBLE NUMBER OF REWRITES

TECHNICAL FIELD

This invention relates to an information recording method and apparatus, an information reproducing method and apparatus, an information recording medium, a program storage medium and a program. More particularly, it relates to an information recording method and apparatus, an information reproducing method and apparatus, an information recording medium, a program storage medium and a program, in which, in a recording medium in which limitations are imposed on the number of times of possible re-writing operations, it is possible to evade congested re-writing in the same area of the recording medium.

This application claims priority of Japanese Patent Application No. 2001-365631, filed on Nov. 30, 2001, the entirety of which is incorporated by reference herein.

BACKGROUND ART

Recently, a variety of optical discs have been proposed as disc-shaped recording mediums that are recordable and that can be dismounted from a recording and/or reproducing apparatus. These recordable optical discs have been proposed as large-capacity mediums of several GBs and are felt to be promising as mediums for recording AV (audio visual) signals, such as video signals.

Among the encoding systems for digitally compressing digital video signals, there is an MPEG (Moving Picture Experts Group) 2 system. The MPEG 2 is also finding application in recording digital video signals on recording mediums. For example, in recording digital video signals on a recording medium, the video signals are encoded in accordance with the MPEG2 system to record an encoded bitstream on a recording medium. In the digital television (TV) broadcast, which recently made its debut, a video program, encoded in accordance with the MPEG2 system, is transmitted in accordance with the format termed a transport stream. In recording the digital broadcast on an information recording medium, such a system is used in which the transport stream is recorded in the form of digital signals, without decoding or re-encoding.

The disc medium is superior in random accessibility. In recording digital video signals on a disc-shaped recording medium, by exploiting this property, recording may be started from an arbitrary vacant area even if plural vacant areas are present distributed on the disc medium, these vacant areas being sequentially searched to continue the recording in arbitrary recording areas.

If, in a recording medium where limitations are imposed on the number of times of allowed re-writing operations, the rewriting occurs in a congested fashion in the same area on the recording medium, deficiencies tend to be produced in this area. For example, if a recording apparatus exercises control so that recording is started at all times from the vacant area lying towards the inner rim side of the disc-shaped recording medium, the probability is high that the inner rim side of the disc tends to become a defective area at an earlier time than its outer rim side.

If a defective area is produced in the disc, such area becomes unusable, so that the total possible recording time for the disc, that is the total recordable data volume, is decreased. This is perplexing to a user of the recording apparatus because the total possible recording time differs from disc to disc even although the species of the disc are the same. In order to prevent such problem from occurring in the case of a recording medium with a limited number of times of possible rewriting operations, such recording management is required in which the entire recording area is repeatedly recorded in an unbiased fashion.

DISCLOSURE OF THE INVENTION

It is therefore an object of the present invention to enable recording management to be performed in such a manner that congested recording in the same area of the recording medium may be evaded to permit the vacant areas of the recording medium to be recorded repeatedly in an unbiased manner to prevent defects from being produced in a preset area of the recording medium.

A first information recording apparatus of the present invention includes first recording means for recording the information, which is to be recorded on an information recording medium, in a predetermined specified area in the recording medium, based on an arraying attribute pertinent to the arraying on the information recording medium of the information, acquisition means for acquiring the last written address of the information in the specified area, and second recording means for recording the address obtained by the acquisition means on the information recording medium.

The first recording means records the information in the predetermined specified area in the recording medium based on the address obtained by the acquisition means.

A first information recording method of the present invention includes a first recording step of recording the information, to be recorded on an information recording medium, in a predetermined specified area thereof, based on an arraying attribute pertinent to the arraying on the information recording medium of the information, an acquisition step of acquiring the last written address of the information in the specified area and a second recording step of recording the address obtained by the acquisition step on the information recording medium.

A program of a first storage medium of the present invention includes a first recording step of recording the information, to be recorded thereon, in a predetermined specified area thereof, based on an arraying attribute pertinent to the arraying on the information recording medium of the information, an acquisition step of acquiring the last written address of the information in the specified area, and a second recording step of recording the address obtained by the acquisition step on the information recording medium.

A first program of the present invention includes a first recording step of recording the information, to be recorded on an information recording medium, in a predetermined specified area in the recording medium, based on an arraying attribute pertinent to the arraying on the information recording medium of the information, an acquisition step of acquiring the last written address of the information in the specified area, and a second recording step of recording the address obtained by the acquisition step on the information recording medium.

A first information recording medium of the present invention has recorded thereon the information in a predetermined specified area thereof, based on the arraying attribute pertinent to the arraying of the information thereon, there being recorded the last written address of the information in the specified area.

A second information recording apparatus of the present invention includes formulating means for formulating the information of an anchor information area of such a data structure having one header table and one or more loop table(s), the header table having a preset number of pointing blocks, each of the loop table(s) having a preset number of updated blocks, first recording means for recording, in one of the pointing blocks of the header table, data indicating that the pointing block currently has the effective information and data indicating one the loop table having the currently effective information recorded therein, second recording means for recording, in the one updated block in the currently effective loop table, data indicating that it has the currently effective information and third recording means for recording the address information in the currently effective updated block, the address information having file management data recorded therein.

There may also be provided fourth recording means for recording the defect information of the pointing block in the header table in the anchor information area.

There may also be provided fourth recording means for recording the defect information of the updated block in the currently effective loop table in the anchor information area.

A second information recording method of the present invention includes a formulating step of formulating the information of an anchor information area of such a data structure having one header table and one or more loop table(s), the header table having a preset number of pointing blocks, each of the loop table(s) having a preset number of updated blocks, a first recording step of recording, in one of the pointing blocks of the header table, data indicating that the pointing block has the currently effective information and data indicating one the loop table having the currently effective information recorded therein, a second recording step of recording, in the one updated block in the currently effective loop table, data indicating that it has the currently effective information and a third recording step of recording the address information in the currently effective updated block, the address information having file management data recorded therein.

A program for a second program storage medium of the present invention includes a formulating step of formulating the information of an anchor information area of such a data structure having one header table and one or more loop table(s), the header table having a preset number of pointing blocks, each of the loop table(s) having a preset number of updated blocks, a first recording step of recording, in one of the pointing blocks of the header table, data indicating that the pointing block has the currently effective information and data indicating one the loop table having the currently effective information recorded therein, a second recording step of recording, in the one updated block in the currently effective loop table, data indicating that it has the currently effective information, and a third recording step of recording the address information in the currently effective updated block, the address information having file management data recorded therein.

A second program of the present invention has a computer execute a formulating step of formulating the information of an anchor information area of such a data structure having one header table and one or more loop table(s), the header table having a preset number of pointing blocks, each of the loop table(s) having a preset number of updated blocks, a first recording step of recording, in one of the pointing blocks of the header table, data indicating that the pointing block has the currently effective information and data indicating one the loop table having the currently effective information recorded therein, a second recording step of recording, in the one updated block in the currently effective loop table, data indicating that it has the currently effective information, and a third recording step of recording the address information in the currently effective updated block, the address information having file management data recorded therein.

A second information recording medium of the present invention has recorded thereon the information of an anchor information area of such a data structure including one header table and one or more loop table(s), the header table having a preset number of pointing blocks, each of the loop table(s) having a preset number of updated blocks, one of the pointing blocks in the header table including data indicating that the pointing block has the currently effective information and data specifying one loop table having the currently effective data recorded therein, one updated block in the currently effective loop table including data indicating that the updated block has the currently effective information, there being further recorded in the currently effective updated block the address information having the file management data recorded therein.

A first information reproducing apparatus of the present invention includes reproducing means for reproducing the first data of the pointing block or the third data of the updated block, from the information recording medium, and controlling means for performing control for retrieving an effective one of the pointing blocks, based on the first data of the pointing block reproduced by the reproducing means, and for retrieving an effective one of the updated blocks based on the third data in the updated block.

A first information reproducing method of the present invention includes a reproducing step for reproducing the first data of the pointing block or the third data of the updated block, from the information recording medium, and a controlling step for performing control for retrieving an effective one of the pointing blocks, based on the first data of the pointing block reproduced by the reproducing step, and for retrieving an effective one of the updated blocks based on the third data in the updated block.

A program of a third program storage medium of the present invention includes a reproducing step for reproducing the first data of the pointing block or the third data of the updated block, from the information recording medium, and a controlling step for performing control for retrieving an effective one of the pointing blocks, based on the first data of the pointing block reproduced by the reproducing step, and for retrieving an effective one of the updated blocks based on the third data in the updated block.

A third program for allowing to execute a program includes a reproducing step for reproducing the first data of the pointing block or the third data of the updated block, from the information recording medium, and a controlling step for performing control for retrieving an effective one of the pointing blocks, based on the first data of the pointing block reproduced by the reproducing step, and for retrieving an effective one of the updated blocks based on the third data in the updated block.

A second information reproducing apparatus of the present invention includes reproducing means for reproducing the defect information of the pointing blocks from the information recording medium, and controlling means for performing control for comparing the defect state of data of the header table actually reproduced from the information recording medium to the defect information reproduced by the reproducing means, and discontinuing the reproduction processing of the information of the anchor information area including the header table, in case of non-matching between the defect state and the defect information, for shifting to reproduction processing for another one of the anchor information areas.

A second information reproducing method of the present invention includes a reproducing step of reproducing the defect information of the pointing blocks from the information recording medium and a controlling step of performing control for comparing the defect state of data of the header table actually reproduced from the information recording medium to the defect information reproduced by the reproducing means, and discontinuing the reproduction processing of the information of the anchor information area including the header table, in case of non-matching between the defect state and the defect information, for shifting to reproduction processing for another one of the anchor information areas.

A program of a fourth program storage medium of the present invention includes a reproducing step of reproducing the defect information of the pointing blocks from the information recording medium, and a controlling step of performing control for comparing the defect state of data of the header table actually reproduced from the information recording medium to the defect information reproduced by the reproducing means, and discontinuing the reproduction processing of the information of the anchor information area including the header table, in case of non-matching between the defect state and the defect information, for shifting to reproduction processing for another one of the anchor information areas.

A fourth program allows to execute a reproducing step of reproducing the defect information of the pointing blocks from the information recording medium and a controlling step of performing control for comparing the defect state of data of the header table actually reproduced from the information recording medium to the defect information reproduced by the reproducing means, and discontinuing the reproduction processing of the information of the anchor information area including the header table, in case of non-matching between the defect state and the defect information, for shifting to reproduction processing for another one of the anchor information areas.

A third information reproducing apparatus of the present invention includes reproducing means for reproducing the defect information of the updated blocks of the currently effective loop table, from the information recording medium, and controlling means for performing control for comparing the defect state of data of the header table actually reproduced from the information recording medium to the defect information reproduced by the reproducing means, discontinuing the reproduction processing of the information of the anchor information area including the loop table, in case of non-matching between the defect state and the defect information, for shifting to reproduction processing for another one of the anchor information areas.

A third information reproducing method of the present invention includes a reproducing step of reproducing the defect information of the updated blocks of the currently effective loop table, from the information recording medium, and a controlling step of performing control for comparing the defect state of data of the header table actually reproduced from the information recording medium to the defect information reproduced by the reproducing means, discontinuing the reproduction processing of the information of the anchor information area including the loop table, in case of non-matching between the defect state and the defect information, for shifting to reproduction processing for another one of the anchor information areas.

A program of a fifth program storage medium includes a reproducing step of reproducing the defect information of the updated blocks of the currently effective loop table, from the information recording medium, and a controlling step of performing control for comparing the defect state of data of the header table actually reproduced from the information recording medium to the defect information reproduced by the reproducing means, discontinuing the reproduction processing of the information of the anchor information area including the loop table, in case of non-matching between the defect state and the defect information, for shifting to reproduction processing for another one of the anchor information areas.

A fifth program of a program storage medium of the present invention includes a reproducing step of reproducing the defect information of the updated blocks of the currently effective loop table, from the information recording medium, and a controlling step of performing control for comparing the defect state of data of the header table actually reproduced from the information recording medium to the defect information reproduced by the reproducing means, discontinuing the reproduction processing of the information of the anchor information area including the loop table, in case of non-matching between the defect state and the defect information, for shifting to reproduction processing for another one of the anchor information areas.

In the information recording method and apparatus, program storage medium, program and the information recording medium, in the first aspect of the present invention, the last written address of the information recorded in a specified area is recorded on the information recording medium.

In the information recording method and apparatus, program storage medium, program and the information recording medium, in the second aspect of the present invention, the pointing blocks, updated blocks and the address information are recorded on the recording medium.

In the information recording method and apparatus, program storage medium, and the program, in the first aspect of the present invention, control is managed so that effective ones of the pointing blocks or the updated blocks will be retrieved based on first and second data reproduced from the information recording medium.

In the information recording method and apparatus, program storage medium, and the program, in the second aspect of the present invention, the defect state of data of the header table, actually reproduced from the information recording medium, is compared to the reproduced defect information. If the two are not match to each other, the processing of reproducing the information of the anchor information area including the header table is discontinued to move to the processing of reproducing another one of the anchor information areas.

In the information recording method and apparatus, program storage medium, and the program, in the third aspect of the present invention, the defect state of data of the header table, actually reproduced from the information recording medium, is compared to the reproduced defect information. If the two are not match to each other, the processing of reproducing the information of the anchor information area including the loop table is discontinued to move to the processing of reproducing another one of the anchor information areas.

BRIEF DESCRIPTION OF THE DRAWINGS

FIG. 3 illustrates the directory structure formed on the disc.

FIG. 14 illustrates a files system descriptor.

BEST MODE FOR CARRYING OUT THE INVENTION

Figure 1:
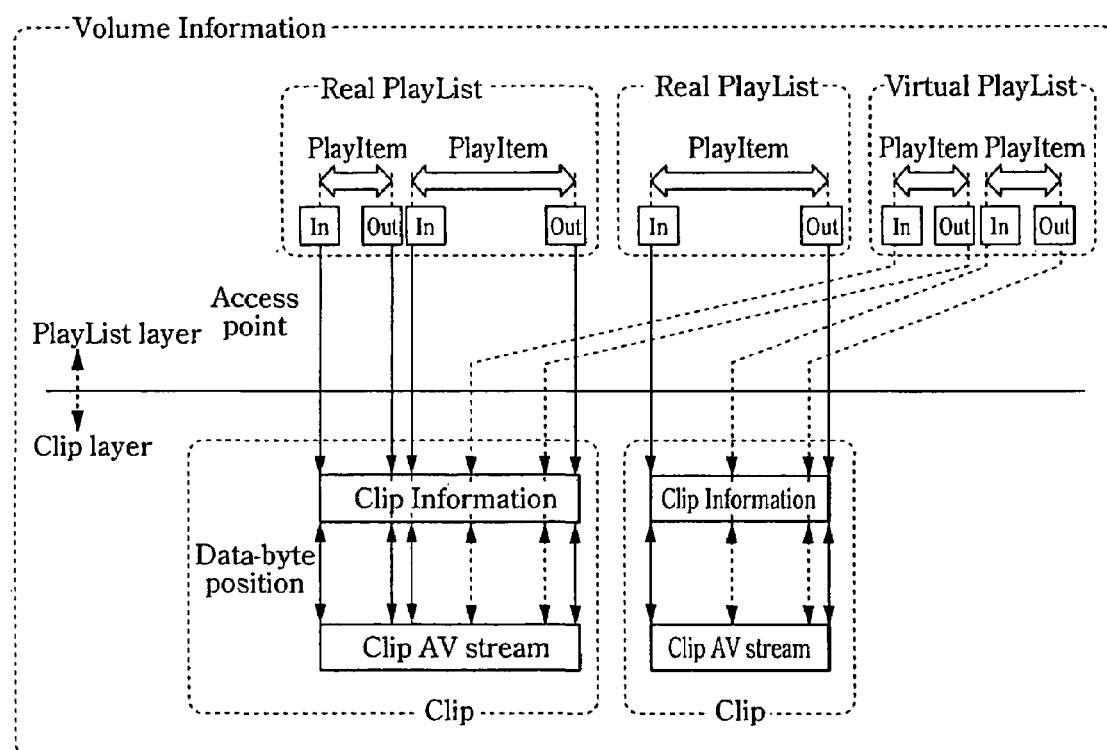
FIG. 1 illustrates the simplified structure of the application format on the recording medium used in a recording and/or reproducing system.

FIG. 1 shows a simplified structure of an application format on a recording medium employed in a recording and/or reproducing system embodying the present invention. This format has two layers, namely a PlayList and a Clip, for managing an AV stream. The Volume Information manages all Clips and PlayLists on the disc.

One AV stream and its auxiliary information, paired together, is thought of as an object, and is termed a clip. An AV stream file and its subsidiary information are termed a Clip AV information file and a clip information file, respectively.

One Clip AV stream file is comprised of data, corresponding to the MPEG2 transport stream arrayed in a structure defined by the DVR application format.

In general, a data file, used in e.g., a computer, is handled as a byte string. The contents of the Clip AV stream file are expanded on the time axis. The PlayList specifies an access point in the clip by a time stamp. When the PlayList specifies the access point to the clip by a time stamp, the clip information file is useful for finding the address information at which to start the decoding of a stream in the Clip AV stream file. To this end, the clip information file has a table showing the relationship of time stamp to address correspondence for time search in the Clip AV stream.

The PlayList was introduced in order for a user to select the reproduction domain the or she desires to view, and to readily edit the so selected reproduction domain. One PlayList is a set of reproduction domains in a clip. One reproduction domain in a given clip is termed the PlayItem which is represented by a pair of an IN point (in-point) and an OUT point (out-point) on the time axis. Consequently, the PlayList is a set of PlayItems.

The PlayList is of two types, one PlayList type being Real PlayList, with the other being Virtual PlayList.

The Real PlayList is deemed to co-own a stream portion of the clip it is referencing. That is, the Real PlayList occupies, in a disc, a data capacity corresponding to the stream portion of the Clip it is referencing. When an AV stream is recorded as a new clip, a Real PlayList, referencing the reproducible range of the entire clip, is created automatically. If a portion of the reproducible range of the PlayList is erased, data of the stream portion of the clip it is referencing is also erased.

The Virtual PlayList is deemed not to co-own Clip data. If the Virtual PlayList is changed or erased, the clip is not changed whatsoever.

In the following explanation, the Real PlayList and the Virtual PlayList are comprehensively referred to simply as the PlayList.

The directories required on a DVR (digital video recording) are as follows:

(1) a root directory inclusive of a 'DVR' directory, and
(2) the 'DVR' directory, inclusive of a 'PlAYLIST' directory, a 'CLIPINF' directory and a 'STREAM' directory.

Figure 2:
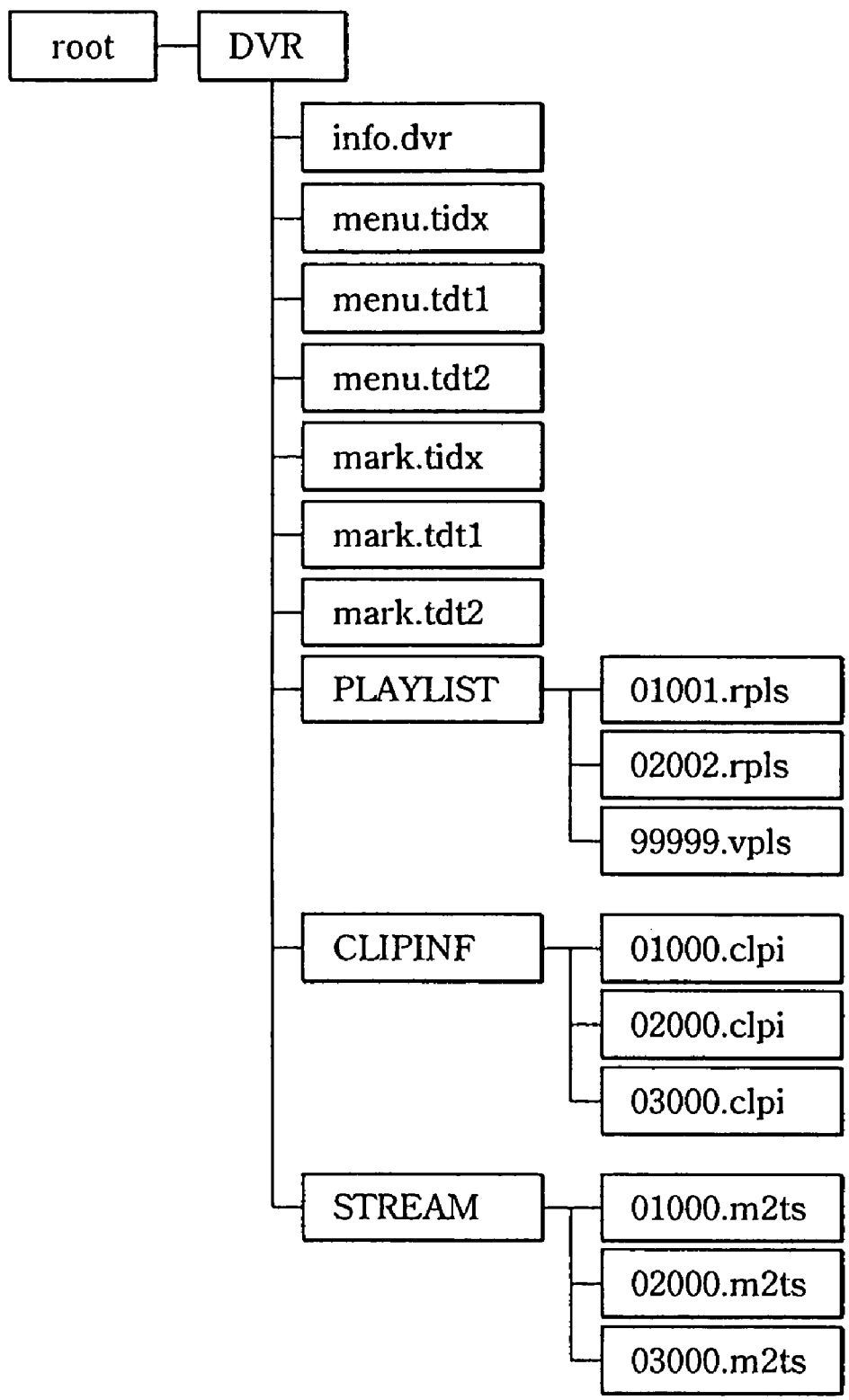
FIG. 2 shows an instance of a directory structure formed on the disc.

FIG. 2 shows a typical directory structure on a DVR disc.

The root directory includes one directory (DVR directory).

All files and directories, prescribed by the DVR application format, are stored under the directory 'DVR'.

The 'DVR' directory includes three directories, namely PLAYLIST, CLIPINF and STREAM directories.

'PLAYLIST'—the data base files Real PlayList and Virtual PlayList are placed under this directory.

'CLIPINF'—the database Clip is placed under this directory.

'STREAM'—the AV stream file is placed under this directory.

The 'PLAYLIST'—stores two sorts of PlayList files, these being the Real PlayList and Victual PlayList.

'xxxxx.rpls'—This file stores the information pertinent to one Real PlayList. One file is created for each Real PlayList. The filename is 'xxxxx.rpls', where 'xxxxx' is comprised of fives figures of from 0 to 9. The file extension is 'rpls'.

'yyyyy.vpls'—This file stores the information pertinent to one Virtual PlayList. One file is created for each Virtual PlayList. The filename is 'yyyyy.vpls', where 'yyyyy' is comprised of fives figures of from 0 to 9. The file extension is 'vpls'.

The 'CLIPINF' directory stores one file in association with each AV stream file.

'zzzzz.clpi'—This file is a Clip Information file associated with one Clip AV stream file. The filename is 'zzzzz.clpi'. 'zzzzz' is comprised of fives figures of from 0 to 9. The file extension is 'clpi'.

The 'STREAM' directory stores a file of the CLIP AV stream.

'zzzzz.m2ts'—This file is an AV stream file handled by the DVR system, and is a CLIP AV stream file. The filename is 'zzzzz.m2ts'. 'zzzzz' is comprised of fives figures of from 0 to 9. The file extension is 'm2ts'.

One Clip AV stream file and the Clip information file associated therewith use the same five figures 'zzzzz'.

The six files of menu.tidx, menu.tdt1, menu.tdt2, mark.tidx, mark.tdt1 and mark.tdt.2 are the files managing the thumbnail picture information. The thumbnail picture means a still picture representing the contents of video signals recorded on a recording medium, or a specified scene of such contents, extracted as a still picture.

The file system used in the information processing apparatus of the present embodiment prescribes the 'Allocation class', as the attribute information pertinent to the file allocation on a recording medium. Each Allocation Class is the information given each file and which is stored in file management data, that is a management information area (MIA).

FIG. 3 shows the relationship between DVR application files and the allocation classes. The DVR application prescribes three file sorts, namely gathered files, real-time files and data files.

The gathered files denote those files which must be read out in a short time on loading a recording medium on a recording or reproducing apparatus. The inf.dvr files, PlayList files (filenames: xxxxx.rpls and yyyyy.vpls),Clip Information files (filename; zzzzz.clpi) and files managing the thumbnail picture information, are sorted under the gathered files.

The real-time files are those files comprised of data the writing or the readout of which must be completed within a preset time. The Clip AV stream file made up of the contents data of the AV data (filename: zzzzz.m2ts) are sorted under the real-time files.

The data files mean ordinary files. The file other than the DVR application files are sorted under the data files.

Figure 4:
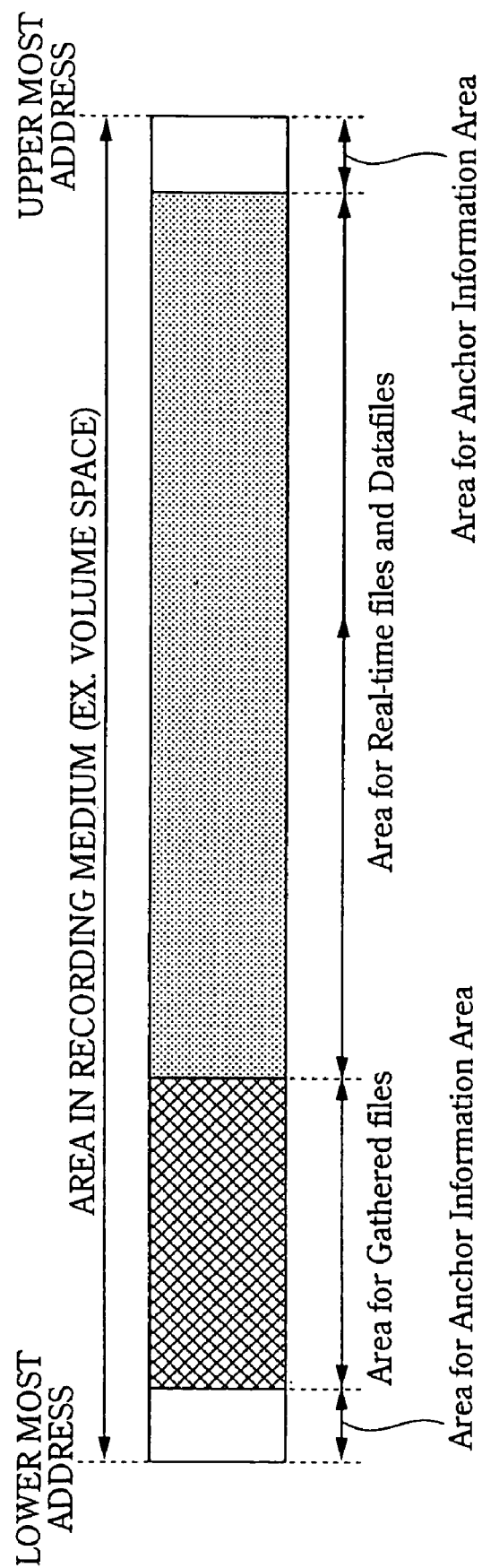
FIG. 4 illustrates exemplary disposition in the volume space of an area for gathered files, areas for the real-time files and the data files and a recording area for the anchor information area (AIA).

FIG. 4 shows a typical layout on the recording medium of respective files of the allocation classes.

The files having the attributes of the gathered files are collectively recorded in an area for gathered files as a specified preset area on the recording medium. The positions on the recording medium of the gathered file areas (start and end addresses) are recorded as file management data in the MIA.

The files having the attributes of the real time files and the data files are arranged in an area for an anchor information area and in an area excluding the area for the gathered files on the recording medium.

The area for the anchor information area (AIA) shown in FIG. 4 is an area in which to record a pointer to an address on the recording medium where the file management data is stored. This area is a preset area on the recording medium. In the present instance, two AIA areas, namely an AIA area towards a lowermost address (inner disc rim) and another AIA area towards an uppermost address (outer rim side), are provided, with data of the same contents being written in these two areas. The resistance against error is increased by writing data in duplex in each of the ALAareas, lying on the inner and outer disc rim sides, thus writing the data in quartets. The AIAs are recorded or reproduced in a preset sequence. For example, the lower address side AIA and the upper address side AIA are recorded in this order. In reproducing the AIA, the lower address side AIA is read out first. If this AIA cannot be read as normally due to data error, the upper address side AIA is then read out.

According to the present invention, recording is managed so that, for evading congested recording in the same sites of the 'area for gathered files' and in the 'area for real-time files and data files', the vacant sites of the respective areas will be repeatedly written in an unbiased fashion. To this end, the last written addresses in the respective areas are recorded in the file management data, that is in MIA.

The method of dealing with the last written addresses of the 'area of the real-time files and the area of data files' is now explained with reference to FIGS. 5 to 8.

Figure 5:
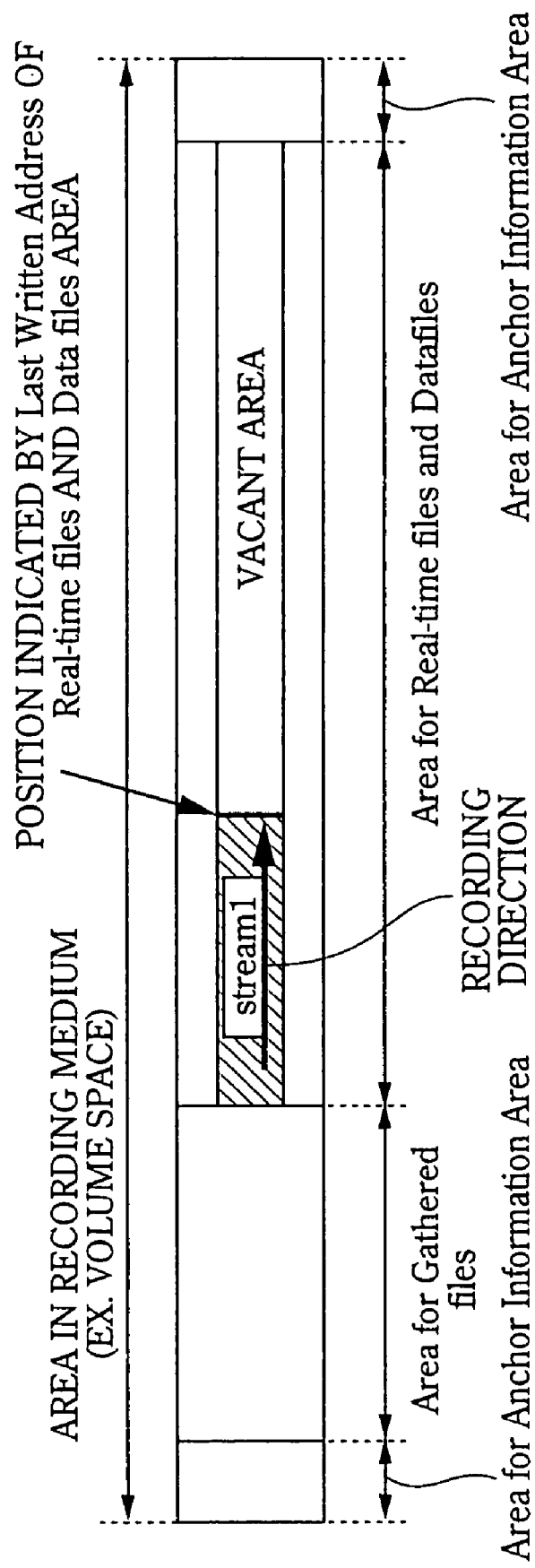
FIG. 5 illustrates the last written address for the areas for the real-time files and the data files.

FIG. 5 shows the state in which a Stream 1 (Clip AV stream) has been recorded on the new recording medium. The Stream 1 is recorded as from the lower address side (left side in the drawing) towards the upper address side (right side in the drawing) of the areas for the real-time files and the data files. The last written address of the Stream 1, shown in FIG. 5, is recorded in the MIA.

Figure 6:
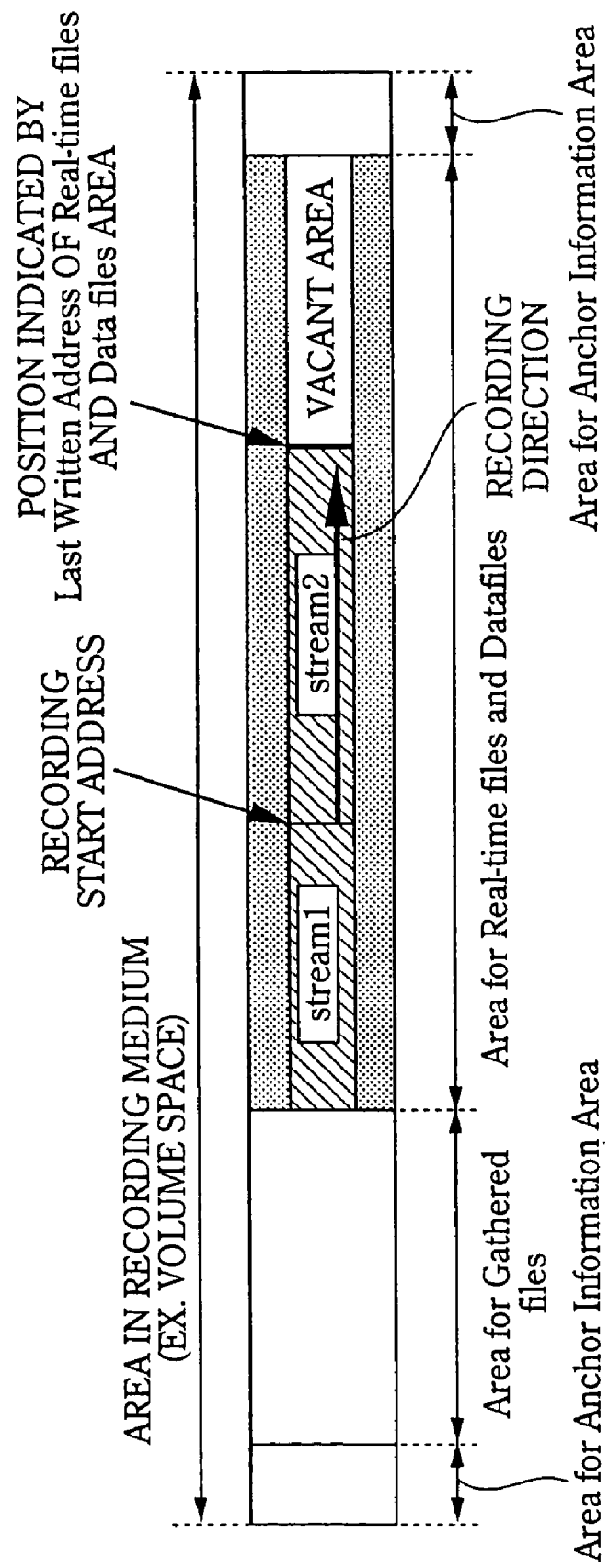
FIG. 6 illustrates the last written address for the areas for the real-time files and the data files.

FIG. 6 shows the state in which a Stream 2 (Clip AV stream) has been recorded next to the state of FIG. 5. The Stream 2 starts to be recorded as from the address next to the last written address of the Stream 1. The last written address of the Stream 2, shown in FIG. 6, is recorded in the MIA.

Figure 7:
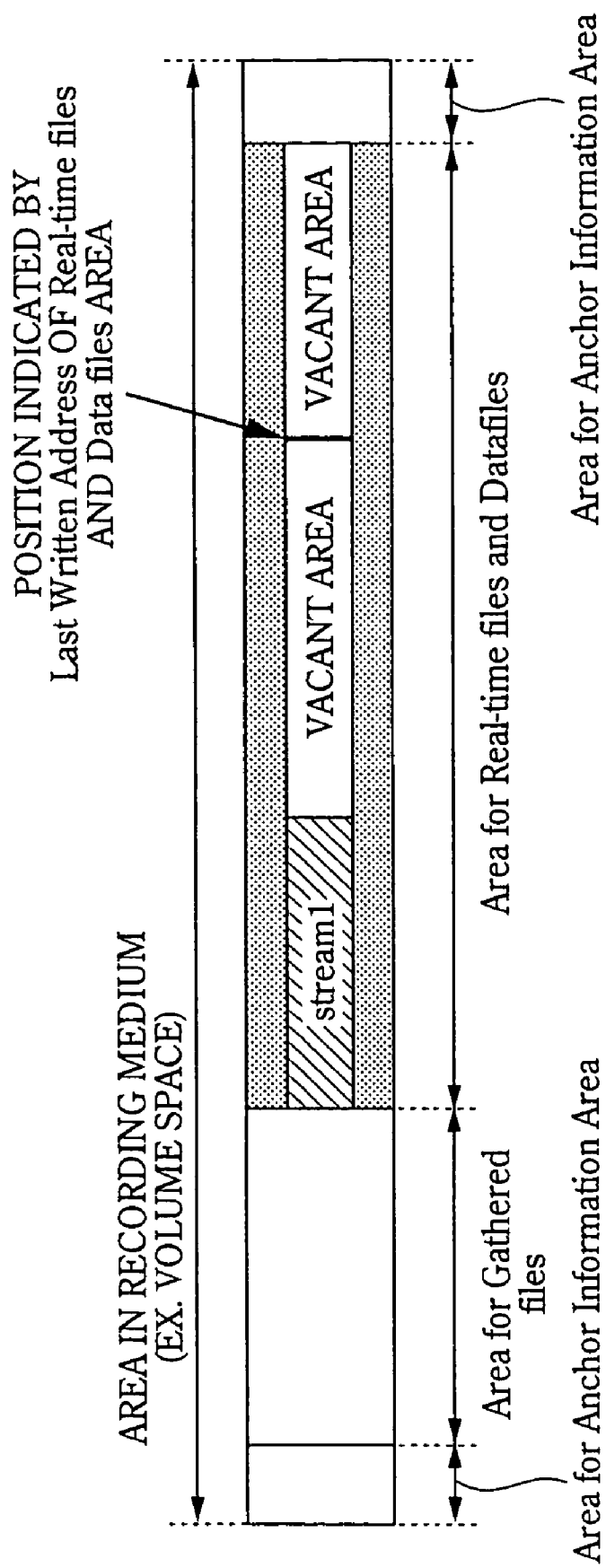
FIG. 7 illustrates the last written address for the areas for the real-time files and the data files.

FIG. 7 shows the state in which a Stream 2 (Clip AV stream) has been erased next to the state of FIG. 6. The value of the last written address in the MIA is not changed.

Figure 8:
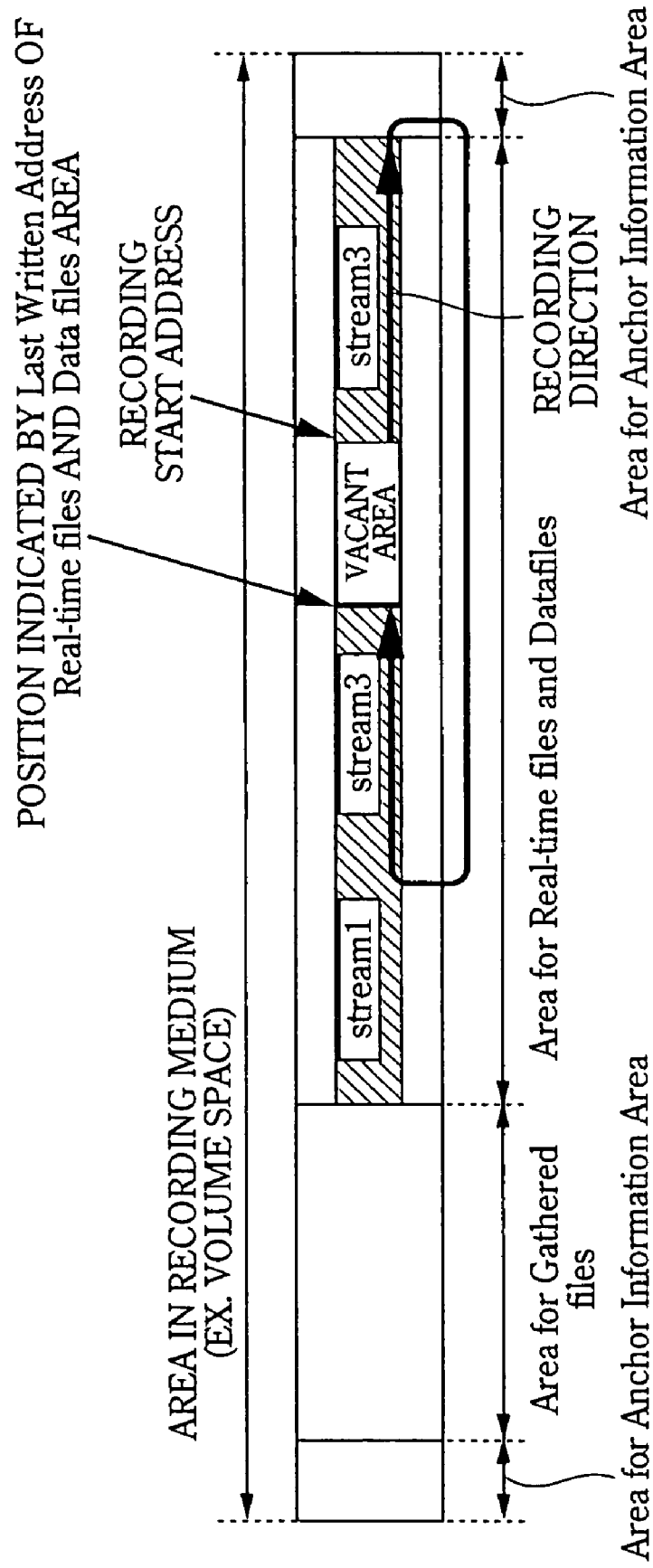
FIG. 8 illustrates the last written address for the areas for the real-time files and the data files.

FIG. 8 shows the state in which a Stream 3 (Clip AV stream) has been recorded next to the state of FIG. 7. The Stream 3 starts to be recorded as from an address directly following the address indicated by the last written address in the state of FIG. 7. When the recording of the Stream 3 progresses up to the uppermost address of the vacant area in the areas for the real-time files and the data files, recording moves to the lowermost address of the vacant area in the areas for the real-time files and the data files, from where the recording is continued. The last written address in the Stream 3 shown in FIG. 8 is recorded in the MIA.

Figure 9:
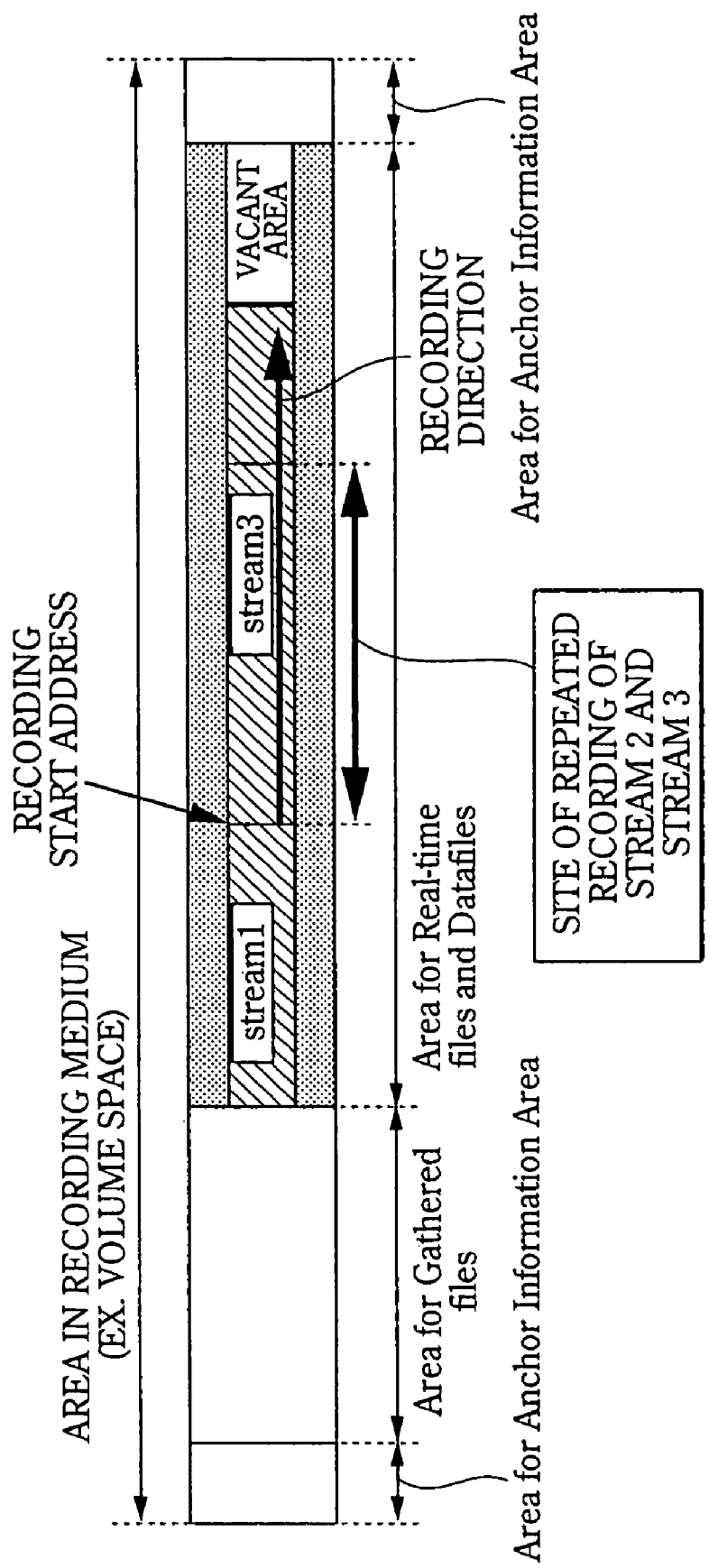
FIG. 9 illustrates an inconvenience which arises in the absence of the last written address.

For comparing the case in which the last written address is recorded in the MIA to the case in which the last written address is not recorded in the MIA, FIG. 9 shows the state in which the Stream 3 is recorded next to the state of FIG. 7 in the absence of the last written address. In this case, the Stream 3 starts to be recorded as from the lowermost address of the vacant area in the areas for the real-time files and the data files, that is from the position directly following the Stream 1. The result is there is produced an area where the Streams 2, 3 have been recorded repeatedly. If, next to this state, the Stream 3 is erased and a new Stream is subsequently recorded, the Stream is recorded in the same site where the Stream 3 was recorded, so that the rewriting occurs in a congested fashion in the same area. In case limitations are imposed on the number of times of rewriting of a recording medium, the area where the recording occurs in a congested fashion tends to be a defective area.

In case management is performed as shown in FIGS. 5 to 8, new data are recorded in a looped fashion in the vacant area, thus allowing to suppress the occurrence of such defects.

Figure 10:
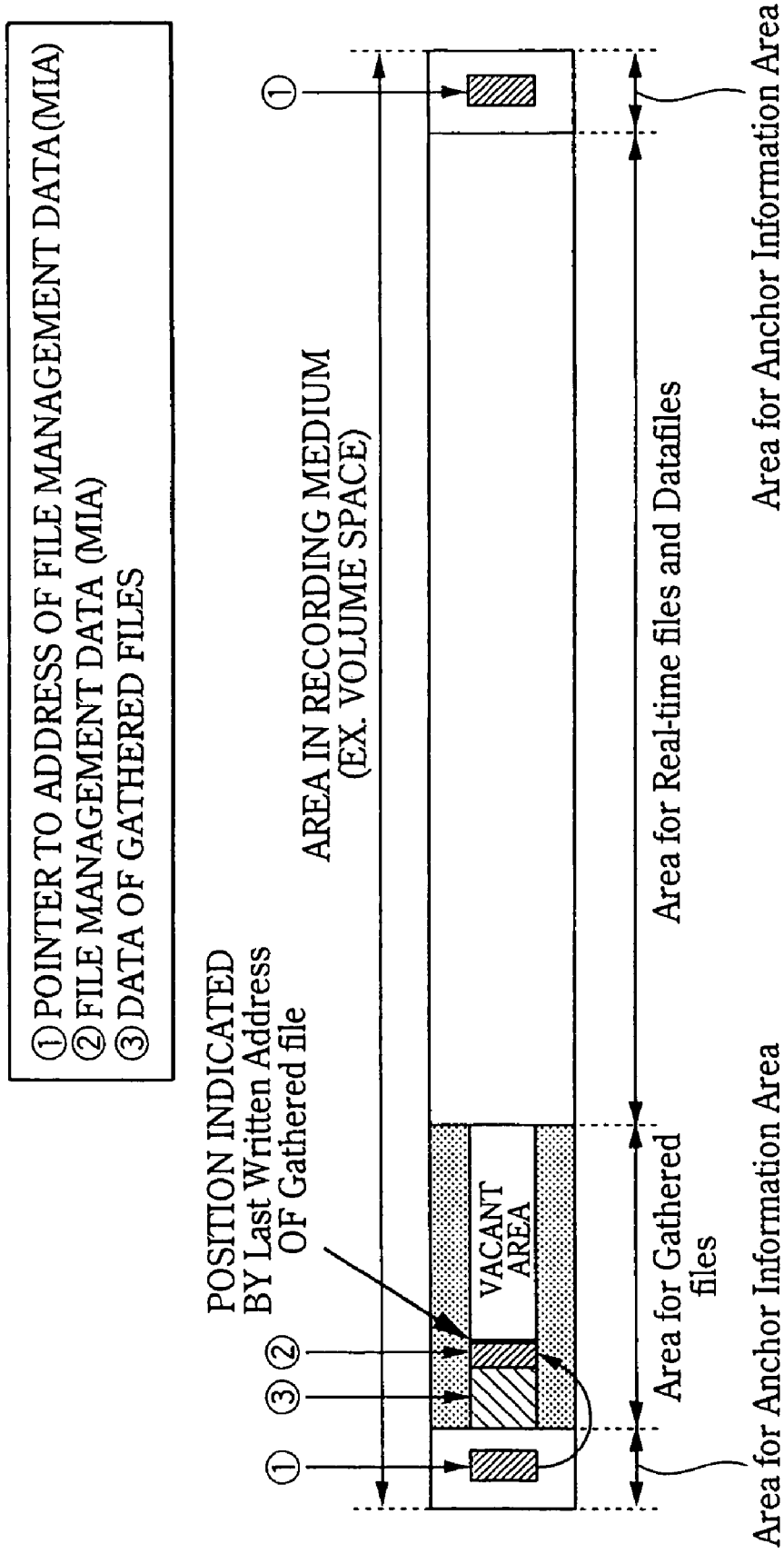
FIG. 10 illustrates the last written address for the area for gathered files.
Figure 11:
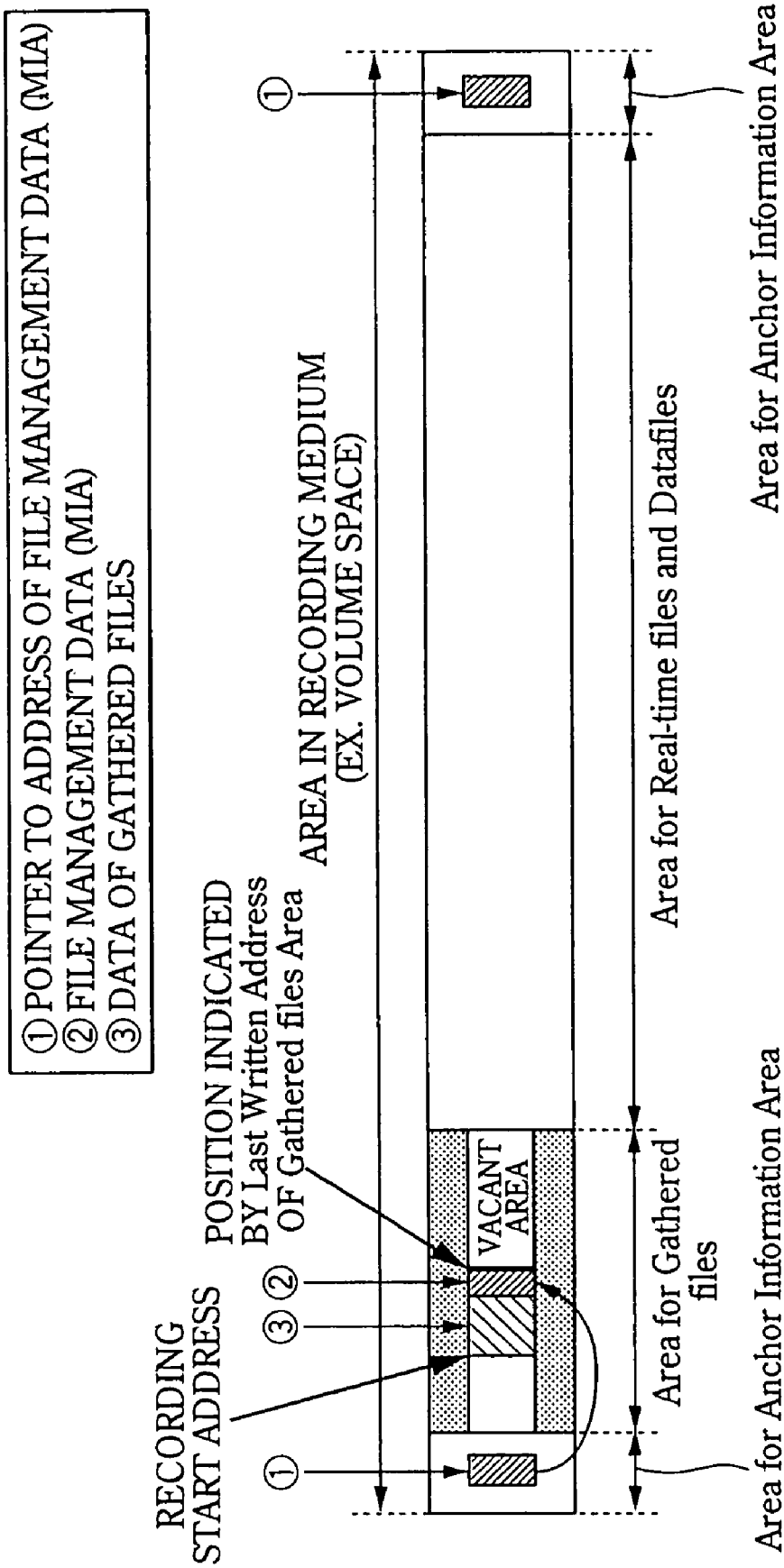
FIG. 11 illustrates the last written address for the area for gathered files.

Referring to FIGS. 10 and 11, the method of dealing with the last written address in the 'area for gathered files' is explained.

FIG. 10 shows the state in which data of certain gathered files have been recorded in the area for gathered files. Next to data of the gathered files (indicated by a numeral ③ in FIG. 10), file management data (MIA), indicated by a numeral ② in FIG. 10, is recorded. The last written address in the area for gathered files is recorded in the MIA. The pointer to the MIA address, indicated by a numeral ① in FIG. 10, and which is the start address of main MIA or start address of reverse MIA, is recorded in the anchor information area in FIG. 14, as will be explained subsequently.

FIG. 11 shows the state of recording the data of the gathered files. Recording of data, indicated by a numeral ③ in FIG. 11, is started as from an address directly following the last written address in the state of FIG. 10. Next to the data of the Gathered files, the management information area (MIA), indicated by the numeral ② in FIG. 11, is recorded. The last written address in the area for gathered files is recorded in the MIA. The pointer to the MIA address, indicated by a numeral ① in FIG. 11, is recorded in the anchor information area.

Figure 12:
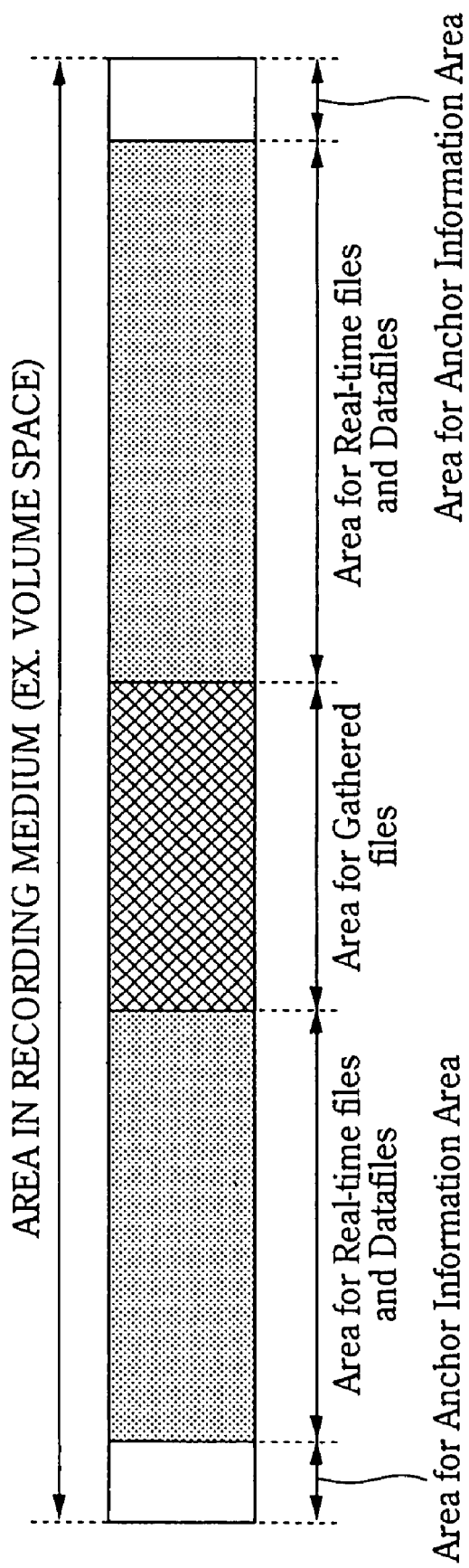
FIG. 12 illustrates an instance in which an area for gathered files separates an area for the real-time files and an area for data files from each other.

Meanwhile, the area for gathered files is movable on the recording medium. For example, if many defects are produced in the area for gathered files, a new area for gathered files is created and its position on the recording medium is recorded in the MIA. In the instance of FIG. 12, the area for gathered files is arranged at a position of dividing the area for real-time files from the area for the data files area.

Next, the structure of the anchor information area is explained. The anchor information area is such an area in which a pointer to an address of the management information area (MIA) is to be recorded. This area is used to allow to move the recording address of the management information area (MIA). If the recording address of the management information area (MIA) is fixed, re-writing occurs in the same area in a congested fashion. The result is that, in the case of a recording medium in which limitations are imposed on the number of times of the possible recording operations, the area of congested recording undesirably tends to prove a defect.

Figure 13:
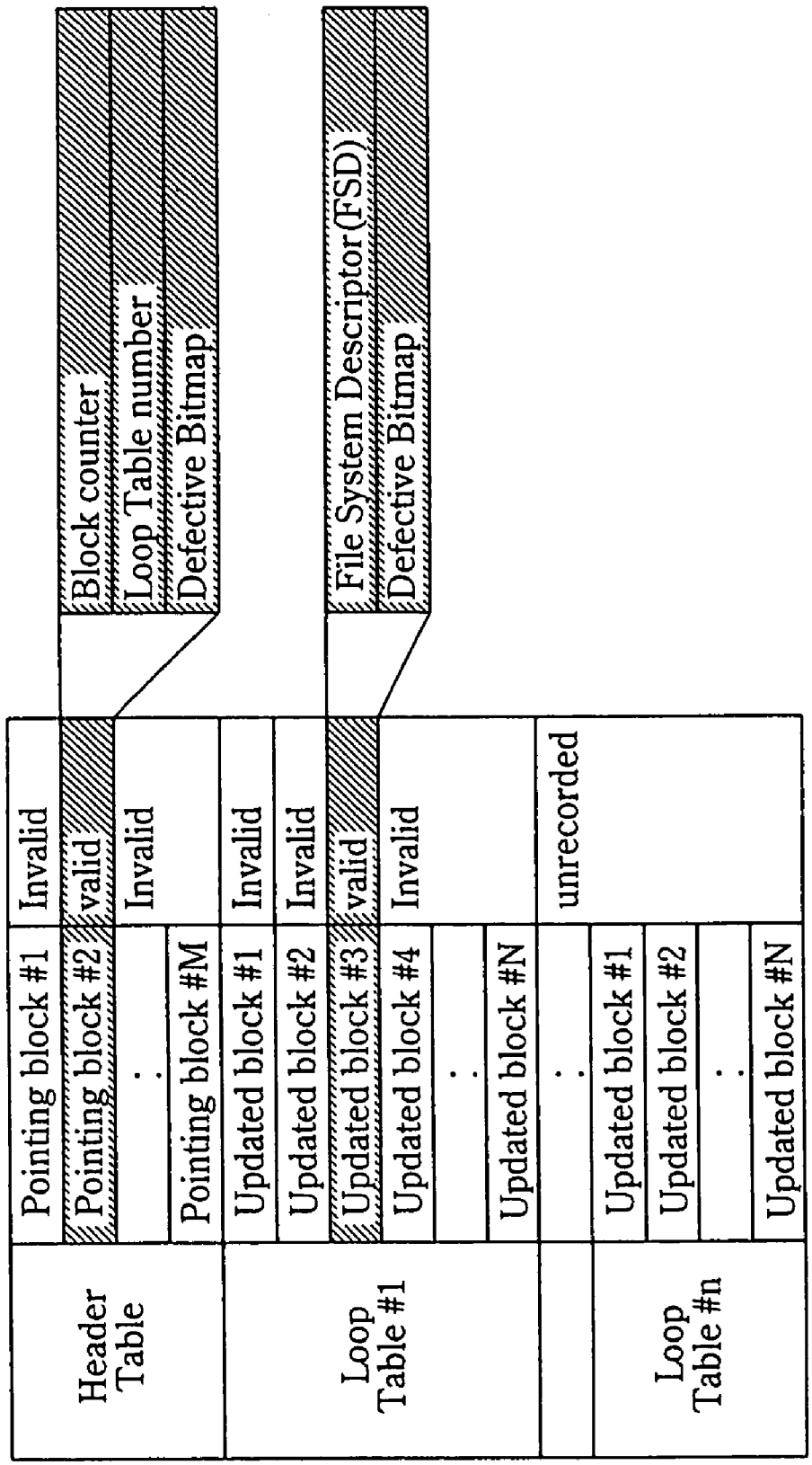
FIG. 13 shows an instance of a data structure of the anchor information area.

FIG. 13 shows an exemplary structure of the anchor information area. The structure of the anchor information area is divided into a header table and one or more loop table(s). In gross terms, the header table indicates the number of the loop table currently having the effective data, with the loop referenced by the number having a pointer to a recording address of the management information area (MIA).

The header table is made up of one or more pointing block(s). In the instance of FIG. 13, there are M pointing blocks. Each pointing block has a block counter field, a loop table number field, and a defective bitmap field. When a given pointing block is recorded and its contents are updated, the value of the block counter field of the pointer block is updated to a value larger than the block counter field of the other pointing block. That is, the largest value of the block counter field is held valid. If the same pointing block is to be updated, it is sufficient if the current block counter value is incremented by one. If the same pointing block is repeatedly recorded such that its pointing block is defective, the pointing block is no longer used and the next pointing block is used. Consequently, the header table has one or more pointing block(s).

The defective bitmap field indicates whether or not each pointing block in the header table is defective. The defective map field has a value of M bits and indicates the defective state of the pointing blocks #1 to #M in the sequence from its MSB to LSB sides. For example, '1' and '0' indicate the defective state and the non-defective state, respectively. The defective bitmap, currently effective, is recorded in the pointing block having the maximum number of the block counter. The pointing block, showing that the defective bitmap indicates a defect, is not used as from the next recording, that is, the information is not recorded in the pointing block as from the next recording.

The loop table has one or more updated block fields. The number of the updated block fields in the instance of FIG. 13 is N. If a given updated block is recorded to update its contents, the sequence number of the file system descriptor (FSD) recorded in the updated block (see FIG. 14) is updated to a value larger than the sequence numbers of the other updated blocks. That is, the sequence number having the largest value is held valid. If the same updated block is to be updated, it suffices to increment the value of the current sequence number by one. If the same updated block is repeatedly recorded, such that the updated block becomes defective, the updated block is not used and, in its stead, the next updated block is used. To this end, the loop table unit has one or more updated block(s). The defective bitmap field indicates whether or not each updated block in the loop table is defective. The defective bitmap field is of an N-bit value and indicates the defective state of the updated blocks #1 to #N in a sequence of from the MSB towards its LSB. The currently effective bitmap is recorded in the updated block having the maximum sequence number. The updated block, the defective bitmap of which indicates a defect, is not used as from the next recording, that is, no information is recorded in this updated block.

The size of the pointing block and that of the updated block correspond to the size of the ECC (error correction code) block.

As a modification of the data structure of FIG. 13, it is also possible for the header table to have the information of the defective bitmap of the currently effective loop table indicated by the header table.

In the FSD, there are recorded, in addition to the sequence number, the start address of main MIA and the start address of the reserve MIA, for indicating the start address of the recording position of MIA, as shown in FIG. 14. The MIA is of the duplex recording type, such that, in the reserve MIA, the same information as that recorded in the main MIA is recorded. In recording, the main MIA and the reserve MIA are recorded in this order. In reproduction, the main MIA is read out first. If the main MIA is not readable because of data errors, the reserve MIA is read out.

Figure 15:
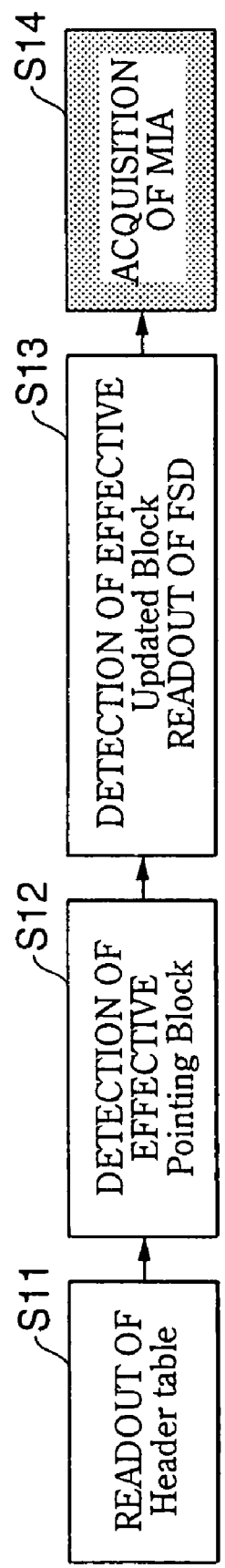
FIG. 15 is a flowchart for illustrating the flow of getting to MIA from the contents of the anchor information area in case of a data structure of FIG. 13.

The processing flow of acquiring a pointer to a recording address of MIA from the data of the anchor information area is explained by referring to FIG. 15.

step S11: The data of the header table is read out.
step S12: The pointing block, having the maximum value of the block counter, is detected from among the read-out data. The loop table number field, owned by the valid effective block, thus detected, indicates the number of the loop table having the effective data.
step S13: The data of the loop table, referenced by the above number, is read out. The updated block, having the maximum value of the sequence number of FSD, is detected from the read-out data. The FSD, having the valid updated block, thus detected, is valid.
step S14: The above FSD indicates the address of the MIA.

In the above processing, the case of using the information of the defective bitmap field, is explained.

If, in the processing of step S12, the defect information indicated by the defective bitmap field of the currently defective pointing block is detected to be not at disparity with respect to the defective state of the header table read out at step S11, that is if the two are detected to be matched to each other, the reproduction is continued unchanged, however, if the two are detected to be at disparity, that is, are not matched to each other, for example, if the defective bitmap does not indicate a defective block, but the block read out at step S11 is found to be defective, this anchor information area is not reliable, and hence the reproducing processing of the anchor information area is discontinued. The reproducing processing is started, as from step S11, for the anchor information area AIA at a different site, written in multiplex (see FIGS. 10 and 11).

If, in the processing of step S13, the defect information indicated by the defective bitmap field of the currently defective pointing block is detected to be not at disparity with respect to the defective state of the currently effective header table read out at step S13, that is if the two are detected to be matched to each other, the reproduction is continued unchanged, however, if the two are detected to be at disparity, that is, are not matched to each other, for example, if the defective bitmap does not indicate a defective block, but the block read out at step S13 is found to be defective, this anchor information area is not reliable, and hence the reproducing processing of the anchor information area is discontinued. The reproducing processing is started, as from step S11, for the anchor information area AIA at a different site, written in multiplex (see FIGS. 10 and 11).

Figure 16:
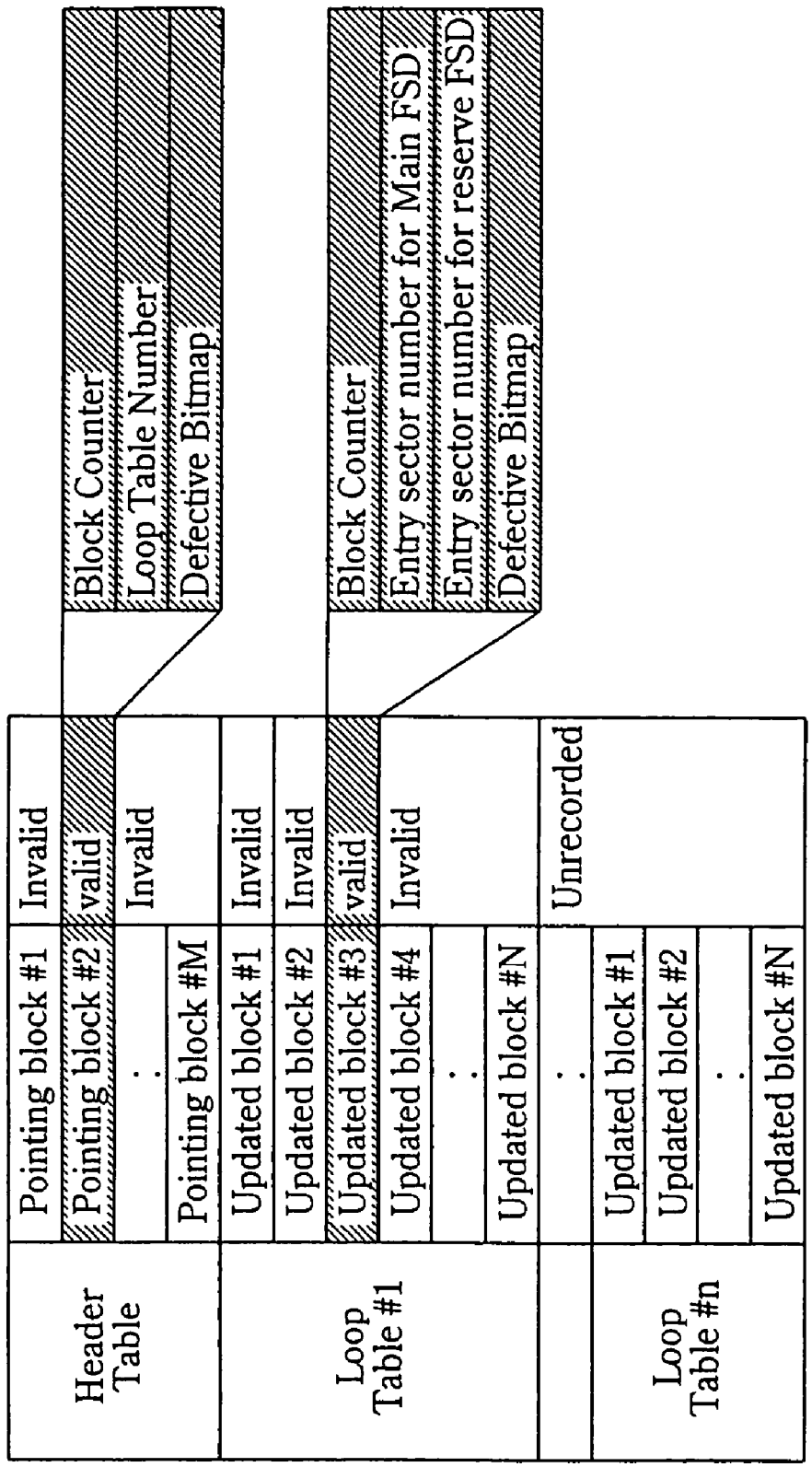
FIG. 16 shows another instance of a data structure of the anchor information area.

Another instance of the structure of the anchor information area is shown in FIG. 16. The structure of the anchor information area of the present embodiment is divided into a header table and one or more loop table(s), as in the embodiment of FIG. 13. Also, the size of the pointing block and that of the updated block correspond to the size of the ECC (error correction code) block. The present embodiment differs from the embodiment of FIG. 13 as to the contents of the updated block of the loop table unit.

The loop table unit of FIG. 16 is also comprised of one or more updated block(s). Each updated block has a block counter field. If a certain updated block is recorded and its contents are updated, the block counter field of the updated block is updated to a value larger than that of the other block counter field. If the same updated block is to be updated, it suffices to increment the value of the current block counter by one. If the same updated block is repeatedly recorded, such that the updated block becomes defective, the updated block is not used and, in its stead, the next updated block is used. To this end, the loop table unit has one or more updated block(s).

Figure 17:
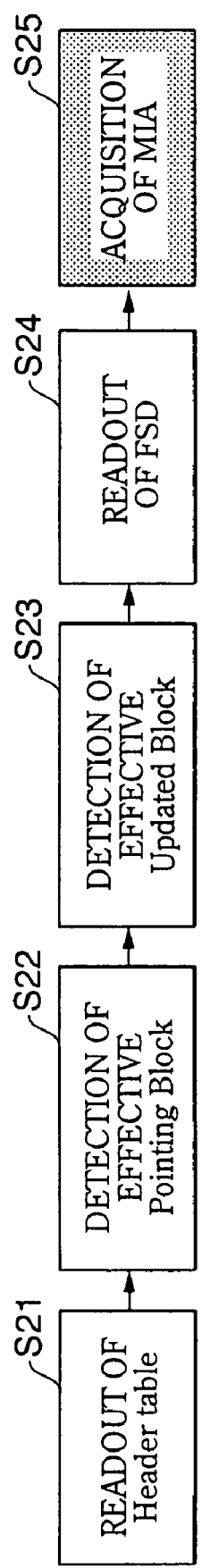
FIG. 17 is a flowchart for illustrating the flow of getting to MIA from the contents of the anchor information area in case of a data structure of FIG. 16.

The processing flow of acquiring a pointer to a recording address of MIA from the data of the anchor information area is explained by referring to FIG. 17.

step S21: The data of the header table is read out.
step S22: The pointing block, having the maximum value of the block counter, is detected from among the read-out data. The loop table number field, owned by the valid pointing block, indicates the number of the loop table having the effective data.
step S23: The data of the loop table, referenced by the above number, is read out. The updated block, having the maximum value of the block counter, is detected from the read-out data. The updated block is valid, with the updated block having a pointer to an address of a valid FSD (entry sector number for main MIA/Reserve FSD). The FSD is written in duplex and the same information as that of the main FSD is recorded in the reserved FSD. In recording, the main FSD and the reserved FSD are recorded in this order. In reproduction, the main FD is first read out. If the main FSD is not readable due to data error, the reserve FDS is read out.
step S24: The FSD is read out from the address indicated by the pointer.
step S25: The above FSD indicates the address of the MIA.

The contents of the file system descriptor (FSD) shown in FIG. 14 are now explained. The FSD has a pointer to an address on the recording medium of MIA.

A signature (BP0) is a field having a preset field.

The Creation Time (BP8) must specify the date and time of formulation of the file system descriptor.

The modification time (BP12) must specify the date and time of formulation of the file system descriptor.

The sequence number (BP16) is as explained previously and is a counter the value of which is incremented each time the contents of the FSD are incremented.

The interchange class (BP18) defines limitations on medium interchangeability.

The reserved (BP19) is reserved for future application. In this field, #00 must be set.

The start address of main MIA (BP20) prescribes the logical block number of the main MIA.

The start address of reserve MIA(BP24) prescribes the first logical block of MIA. For warranting reliability, MIA is recorded in two different positions on the logical volume. One of these is the main MIA, with the other being the reserved MIA.

The length of MIA (BP28) prescribes the size of MIA in terms of a logical block as unit. In MIA, there is no logical block exceeding #FFFF.

The number of MIA map MIBs (BP30) prescribes the number of blocks for the MIA map recorded in the MIA.

The MIA map MIBs in main MIA (BP32) specifies all MIBs belonging to the MIA map in the main MIA. The MIB numbers of these blocks must be recorded in the sequence of the construction of the MIA map.

The MIA map MIBs in reserve MIA (BP32+2×) specifies all MIBs belonging to the MIA map in the MIA. The MIB numbers of these blocks must be recorded in the sequence of construction of the MIA map.

Figure 18:
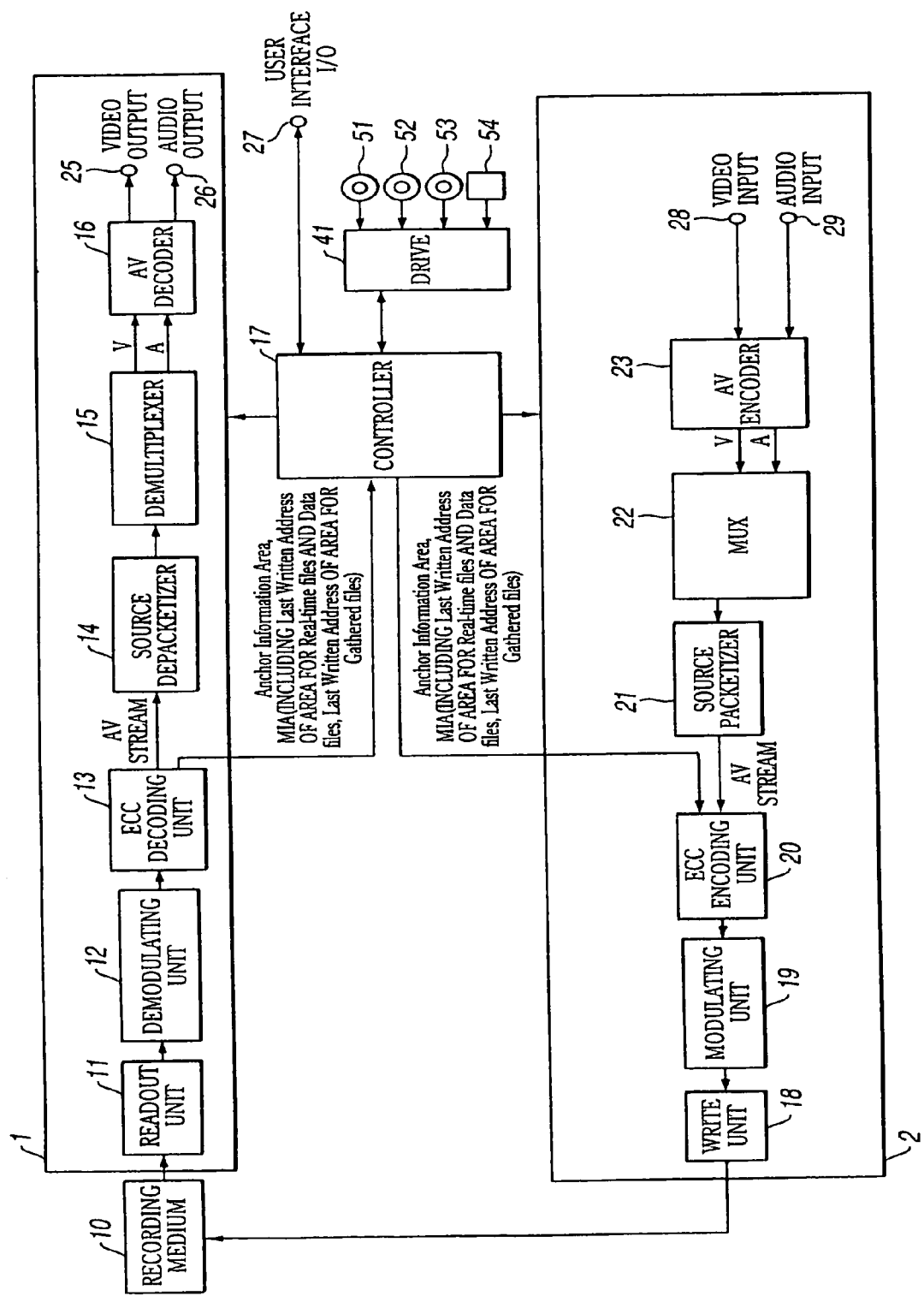
FIG. 18 is a block diagram showing the structure of a moving picture recording and/or reproducing apparatus embodying the present invention.

Referring to FIG. 18 showing a moving picture recording and/or reproducing apparatus, the system for recording and/or reproducing data of the DVR application structure is now explained. This moving picture recording and/or reproducing apparatus is comprised of a reproduction unit 1 and a recording unit 2.

First, the operation in recording is explained, taking the case of encoding and recording an input audio video signals, as an example.

Before proceeding to recording, a controller 17 commands a readout unit 11 to read out data of the anchor information area. The readout unit 11 reads out data of the anchor information area. The readout unit reads out data of the anchor information area. The so read out data is sent via processing in a demodulating unit 12 and in an ECC (error correction) decoding unit 13 to the controller 17. The controller 17 acquires the recording address of MIA based on the data of the anchor information area (see FIGS. 13 or 16).

The controller 17 then commands the readout unit 11 to read out the MIA. The readout unit then reads out the MIA data which is input through processing in the demodulating unit 12 and in the ECC (error correction) decoding unit 13 to the controller 17. The controller 17 acquires the last written address of the areas for the real-time files and the data files, and the last written address of the area for gathered files, included in the MIA.

The video and audio signals are input to terminals 28, 29, respectively. These video and audio signals are input to an AV encoder 23, which then encodes the signals (input video and audio signals) to output an encoded video stream (V) and an encoded audio stream (A) to a multiplexer 22. The encoded video stream (V) may, for example, be an MPEG2 video stream, while the encoded audio stream (A) may, for example, be an MPEG1 audio stream or Dolby AC3 (trademark) audio stream. The multiplexer 22 multiplexes the input stream to output a multiplexed stream. The multiplexed stream may, for example, be an MPEG2 transport stream or an MPEG2 program stream.

The multiplexed stream is input to a source packetizer 21. The source packetizer 21 encodes the input multiplexed stream into an AV stream, comprised of source packets, in accordance with the application format of the recording medium 10. The AV stream is processed by an ECC (error correction coding) unit 20 and by a modulating unit 19 and thence input to a write unit 18. The write unit 18 records the Clip AV stream file on the recording medium 10 based on the control signal as commanded by the controller 17. The controller 17 controls this recording based on the last written address of the areas for the real-time files and the data files.

The moving picture recording and/or reproducing apparatus of FIG. 18 records the Clip AV stream file, while also recording the application database information pertinent to the file, that is the clip information file and the PlayList file. These application database information are formulated by the controller 17. The clip information file is formulated by the controller 17 analyzing the clip AV stream. The PlayList file is formed by the controller 17 based mainly on the user command information input via user interface from terminal 27.

Similarly to the AV stream, the clip information file and the PlayList file, formed by the controller 17, are processed by the ECC (error correction coding) unit 20 and by the modulating unit 19, and thence input to the write unit 18. The write unit 18 records the database file on the recording medium 10, based on the control information as commanded by the controller 17. The controller 17 controls the recording, based on the last written address of the area of gathered files.

The operation in reproduction is now explained.

The recording medium 10 has recorded thereon the AV stream file, the application database information and the file system data.

First, the controller 17 acquires data of the anchor information area, as at the time of recording, described above, and accordingly acquires MIA data.

The controller 17 then commands the readout unit 11 to read out the application database information. So, the readout unit 11 reads out the application database information from the recording medium 10. The application database information then is processed by the demodulating unit 12 and the ECC (error correction) decoding unit 13 and thence supplied to the controller 17.

Based on the application database information, the controller 17 outputs the overview of the PlayList, recorded on the recording medium 10, to a user interface of the terminal 27. The user selects the PlayList, desired to be reproduced, from the overview of the PlayList. The PlayList, specified to be reproduced, is input to the controller 17. The controller 17 commands the readout unit 11 to read out the AV stream file necessary in reproducing the PlayList. So, the readout unit 11 reads out the AV stream from the recording medium 10.

The so read out AV stream is processed by the demodulating unit 12 and by the ECC (error correction) decoding unit 13 and thence supplied to the source depacketizer 14.

The source depacketizer 14 converts the AV stream of the application format of the recording medium 10 into a stream that can be input to the demultiplexer 15, which demultiplexer 15 then inputs the video stream (V) and the audio stream (A), forming the reproduction domain (PlayItem) of the AV stream, as specified by the controller 17, to the AV decoder 16. The AV decoder 16 decodes the video stream and the audio stream to output the reproduced video and audio streams at terminals 25, 26, respectively.

Figure 19:
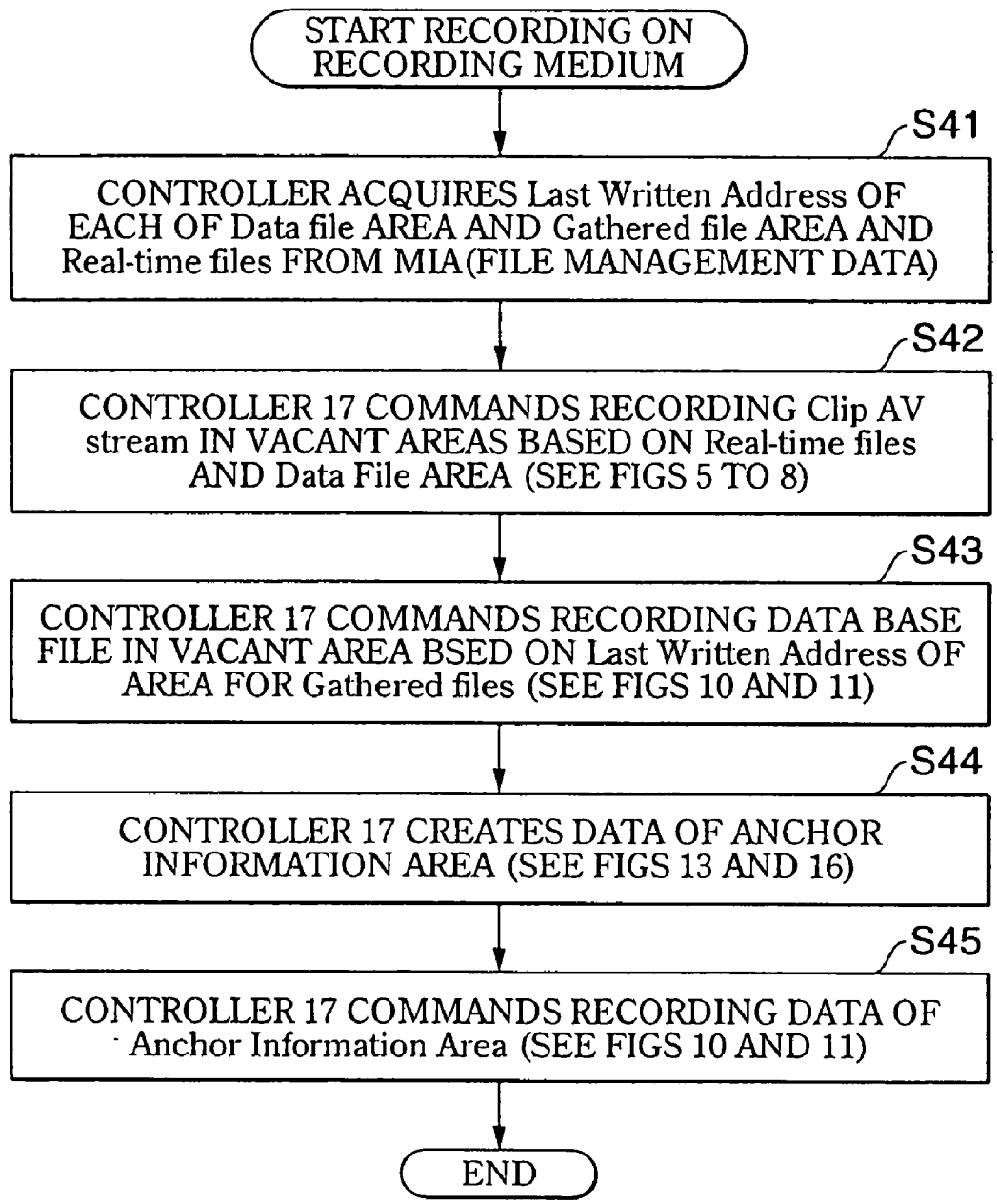
FIG. 19 is a flowchart for illustrating the flow of data recording on a recording medium based on the last written addresses of the areas for the real-time files and the data files and the area for gathered files.

FIG. 19 shows a flowchart for illustrating the processing flow for recording data on the recording medium 10 based on the last written addresses in the real time files and the gathered files, respectively.

At step S41, the controller 17 acquires last written addresses of the areas for the real-time files and the data files and those of the area for the gathered files from the management information area (MIA). This processing will be explained subsequently in detail by referring to FIG. 20.

At step S42, the controller 17 causes the AV encoder 23 to encode the input video signals to record the clip AV stream file on the recording medium 10. At this time, the controller 17 commands the recording of the clip AV stream in the vacant areas of the areas for the real-time files and the data files, based on the last written addresses of these areas for the real-time files and the data files (see FIGS. 5 to 8).

At step S43, the controller 17 causes the application database information, pertinent to the clip AV stream file, that is the clip information file and the PlayList file, to be recorded simultaneously with the recording of the clip AV stream file, as described above. At this time, the controller 17 commands the write unit 18 to record the database file and the MIA in a vacant area of the area for gathered files, based on the last written address of the area for gathered files (see FIGS. 10 and 11).

At step S44, the controller 17 creates data of the anchor information area (see FIGS. 13 and 16).

At step S45, the controller 17 commands the write unit 18 to record the data of the anchor information area in a preset position (see FIGS. 10 and 11).

Figure 20:
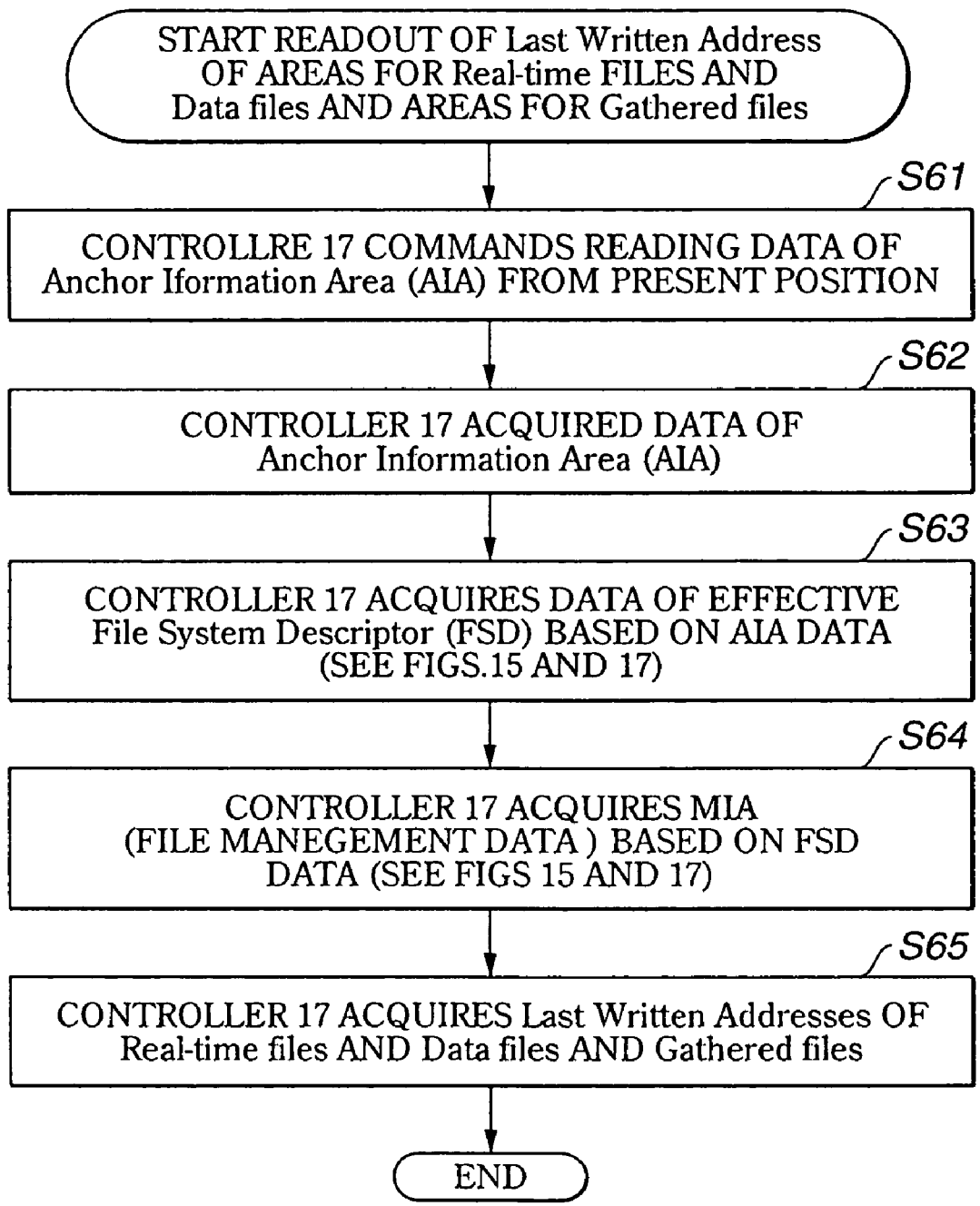
FIG. 20 is a flowchart for illustrating the processing flow for acquiring the last written addresses of the areas for the real-time files and the data files and the area for gathered files based on the contents of the anchor information area.

FIG. 20 shows a flowchart for illustrating the detailed processing of acquiring the last written addresses of the real-time files and the gathered files from the contents of the anchor information area (processing at step S41 of FIG. 19).

At step S61, the controller 17 first commands the readout unit 11 to read out the data of the anchor information area (AIA) from a preset position. So, the readout unit 11 reads out the data of the anchor information area. The so read out data is processed by the demodulating unit 12 and by the ECC (error correction) decoding unit 13 and thence supplied to the controller 17.

At step S62, the controller 17 acquires the data of the anchor information area (AIA).

At step S63, the controller 17 acquires data of the valid file system descriptor (FSD) based on the AIA data (see FIGS. 15 and 17).

At step S64, the controller 17 acquires the data of the management information area (MIA), based on the FSD data (see FIGS. 15 and 17). Specifically, the controller 17 acquires the recording addresses of MIA based on the FSD data (see FIGS. 15 and 17). The controller 17 commands the readout unit 11 to read out the MIA. The data, so read out, is processed by the demodulating unit 12 and by the ECC (error correction) decoding unit 13 so as to be supplied to the controller 17.

At step S65, the controller 17 acquires the last written addresses of the areas for the real-time files and the data files and those of the area for gathered files, included in the MIA.

Although the above-described sequence of operations can be performed on a hardware, it may also be executed by the software. If the sequence of operations is to be executed on the software, the program forming the software is installed in a dedicated hardware built in a computer. Alternatively, the program forming the software is installed from the network or a recording medium in e.g., a general-purpose personal computer which is capable of executing various functions subject to the installing of various programs.

The recording medium is formed not only by a package medium, such as a magnetic disc 51, inclusive of a floppy disc, an optical disc 52, inclusive of a CD-ROM (Compact Disc-Read-Only memory) and DVD (Digital Versatile Disc), a magneto-optical disc 53, inclusive of MD (Mini-Disc), or a semiconductor memory 54, having the program pre-recorded thereon, but also by a ROM or a hard disc, having the program pre-recorded thereon and which is furnished to the user as it is built from the outset in the computer. The drive 41 drives the optical disc 52, magneto-optical disc 53 or the semiconductor memory 54.

In the present specification, the steps stating the program recorded on the recording medium includes parallel processing or batch-wise processing, in addition to the processing executed chronologically in an explicitly stated sequence.

As described above, it becomes possible, in recording data in a vacant area of a recording medium, to select a vacant area for recording, in such manner as to prevent congested writing from occurring in the same area of the recording medium.

Moreover, it becomes possible to evade congested recording in the same area of the recording medium to manage the recording so that recording will be made repeatedly in an unbiased fashion in a vacant area of the recording medium.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

INDUSTRIAL APPLICABILITY

According to the present invention, as described above, recording can be managed in such a manner that congested recording in the same area of the recording medium will be evaded to permit repeated recording in the vacant area of the recording medium in an unbiased fashion. Thus, in a recording medium in which limitations are imposed on the number of times of possible rewriting operations, congested rewriting in the same area of the recording medium may be evaded to render it possible to prevent the defective areas from being formed as a result of the congested recording on the recording medium.

The invention claimed is:

1. An information recording apparatus comprising:

formulating means for formulating the information of an anchor information area of such a data structure having one header table and one or more loop table(s), said header table having a preset number of pointing blocks, each of said loop table(s) having a preset number of updated blocks;

first recording means for recording, in one of said pointing blocks of said header table, data indicating that said pointing block has a currently effective information, data specifying one said loop table having the currently effective information, a first defective bitmap indicating any of the pointing blocks being defective, and a second defective bitmap indicating any of the updated blocks being defective;

second recording means for recording, in said one updated block in said currently effective loop table, data indicating that it has the currently effective information; and third recording means for recording the address information in said currently effective updated block, said address information indicating the location which file management data is recorded therein, wherein said loop tables include updated blocks that are configured to hold file system location information, and said pointing blocks including information designating which loop table is presently valid.

2. An information recording method comprising:

a formulating step of formulating the information of an anchor information area of such a data structure having one header table and one or more loop table(s), said header table having a preset number of pointing blocks, each of said loop table(s) having a preset number of updated blocks;

a first recording step of recording, in one of said pointing blocks of said header table, data indicating that said pointing block has a currently effective information, data indicating one said loop table having the currently effective information, a first defective bitmap indicating any of the pointing blocks being defective, and a second defective bitmap indicating any of the updated blocks being defective;

a second recording step of recording, in said one updated block in said currently effective loop table, data indicating that it has the currently effective information; and a third recording step of recording the address information in said currently effective updated block, said address information indicating the location which file management data is recorded therein, wherein said loop tables include updated blocks that are configured to hold file system location information, and said pointing blocks including information designating which loop table is presently valid.

3. A program storage medium having stored thereon a computer-readable program, said computer-readable program including a formulating step of formulating the information of an anchor information area of such a data structure having one header table and one or more loop table(s), said header table having a preset number of pointing blocks, each of said loop table(s) having a preset number of updated blocks;

a first recording step of recording, in one of said pointing blocks of said header table, data indicating that said pointing block has a currently effective information, data indicating one said loop table having the currently effective information, a first defective bitmap indicating any of the pointing blocks being defective, and a second defective bitmap indicating any of the updated blocks being defective;

a second recording step of recording, in said one updated block in said currently effective loop table, data indicating that it has the currently effective information; and a third recording step of recording the address information in said currently effective updated block, said address information indicating the location which file management data is recorded therein, wherein said loop tables include updated blocks that are configured to hold file system location information, and said pointing blocks including information designating which loop table is presently valid.

4. A computer readable medium with computer instructions therein that when executed by a processor implement steps comprising:

formulating step of formulating the information of an anchor information area of such a data structure having one header table and one or more loop table(s), said header table having a preset number of pointing blocks, each of said loop table(s) having a preset number of updated blocks;

a first recording step of recording, in one of said pointing blocks of said header table, data indicating that said pointing block has a currently effective information, data indicating one said loop table having the currently effective information, a first defective bitmap indicating any of the pointing blocks being defective, and a second defective bitmap indicating any of the updated blocks being defective;

a second recording step of recording, in said one updated block in said currently effective loop table, data indicating that it has the currently effective information; and a third recording step of recording the address information in said currently effective updated block, said address information indicating the location which file management data is recorded therein, wherein said loop tables include updated blocks that are configured to hold file system location information, and said pointing blocks including information designating which loop table is presently valid.

5. An information recording medium having recorded thereon the information of an anchor information area of such a data structure including one header table and one or more loop table(s), said header table having a preset number of pointing blocks, each of said loop table(s) having a preset number of updated blocks;

one of said pointing blocks in said header table including data indicating that the pointing block has a currently effective information, data specifying one loop table having the currently effective data, a first defective bitmap indicating any of the pointing blocks being defective, and a second defective bitmap indicating any of the updated blocks being defective;

one updated block in the currently effective loop table including data indicating that the updated block has the currently effective information;

there being further recorded in the currently effective updated block the address information indicating the location which the file management data is recorded therein, wherein said loop tables include updated blocks that are configured to hold file system location information, and said pointing blocks including information designating which loop table is presently valid.

6. An information reproducing apparatus for reproducing an information recording medium, having recorded thereon the information of an anchor information area of a data structure including one header table and one or more loop table(s), said header table having a preset number of pointing blocks, each of said loop table(s) having a preset number of updated blocks;

one of said pointing blocks in said header table having first data indicating that the pointing block has a currently effective information, second data specifying one loop table having the currently effective information, a first defective bitmap indicating any of the pointing blocks being defective, and a second defective bitmap indicating any of the updated blocks being defective;

one of said updated blocks in said currently effective loop table including third data indicating that it has the currently effective information;

there being recorded the address information, holding file management data, in said currently effective updated block; said apparatus comprising:

reproducing means for reproducing said first data of said pointing block or said third data of said updated block, from said information recording medium; and controlling means for performing control for retrieving an effective one of said pointing blocks, based on said first data of said pointing block reproduced by said reproducing means, and for retrieving an effective one of said updated blocks based on said third data in said updated block, wherein said loop tables include updated blocks that are configured to hold file system location information, and said pointing blocks including information designating which loop table is presently valid.

7. An information reproducing method for reproducing an information recording medium, having recorded thereon the information of an anchor information area of a data structure including one header table and one or more loop table(s), said header table having a preset number of pointing blocks, each of said loop table(s) having a preset number of updated blocks;

one of said pointing blocks in said header table having first data indicating that the pointing block has a currently effective information, second data indicating one loop table holding the currently effective information, a first defective bitmap indicating any of the pointing blocks being defective, and a second defective bitmap indicating any of the updated blocks being defective;

one of said updated blocks in said currently effective loop table including third data indicating that it has the currently effective information;

there being recorded the address information, holding file management data, in said currently effective updated block; said method comprising:

a reproducing step for reproducing said first data of said pointing block or said third data of said updated block, from said information recording medium; and a controlling step for performing control for retrieving an effective one of said pointing blocks, based on said first data of said pointing block reproduced by said reproducing step, and for retrieving an effective one of said updated blocks based on said third data in said updated block, wherein said loop tables include updated blocks that are configured to hold file system location information, and said pointing blocks including information designating which loop table is presently valid.

8. A program storage medium having stored thereon a computer-readable program for an information reproducing apparatus for reproducing an information recording medium, having recorded thereon the information of an anchor information area of a data structure including one header table and one or more loop table(s), said header table having a preset number of pointing blocks, each of said loop table(s) having a preset number of updated blocks;
  one of said pointing blocks in said header table having first data indicating that the pointing block has a currently effective information, second data indicating one loop table holding the currently effective information, a first defective bitmap indicating any of the pointing blocks being defective, and a second defective bitmap indicating any of the updated blocks being defective;
  one of said updated blocks in said currently effective loop table including third data indicating that it has the currently effective information; there being recorded the address information, holding file management data, in said currently effective updated block; said program including:
  a reproducing step for reproducing said first data of said pointing block or said third data of said updated block, from said information recording medium; and
  a controlling step for performing control for retrieving an effective one of said pointing blocks, based on said first data of said pointing block reproduced by said reproducing step, and for retrieving an effective one of said updated blocks based on said third data in said updated block,
  wherein said loop tables include updated blocks that are configured to hold file system location information, and said pointing blocks including information designating which loop table is presently valid.

9. A computer readable medium with computer instructions therein that when executed by a processor implement steps comprising:
  said computer controlling an information reproducing apparatus for reproducing an information recording medium, having recorded thereon the information of an anchor information area of a data structure including one header table and one or more loop table(s), said header table having a preset number of pointing blocks, each of said loop table(s) having a preset number of updated blocks;
  one of said pointing blocks in said header table having first data indicating that the pointing block has a currently effective information, second data indicating one loop table holding the currently effective information, a first defective bitmap indicating any of the pointing blocks being defective, and a second defective bitmap indicating any of the updated blocks being defective;
  one of said updated blocks in said currently effective loop table including third data indicating that it has the currently effective information;
  there being recorded the address information, holding file management data, in said currently effective updated block; said steps including:
  a reproducing step for reproducing said first data of said pointing block or said third data of said updated block, from said information recording medium; and
  a controlling step for performing control for retrieving an effective one of said pointing blocks, based on said first data of said pointing block reproduced by said reproducing step, and for retrieving an effective one of said updated blocks based on said third data in said updated block,
  wherein said loop tables include updated blocks that are configured to hold file system location information, and said pointing blocks including information designating which loop table is presently valid.

10. An information reproducing apparatus for reproducing an information recording medium, having recorded thereon the information of a plurality of anchor information areas, each being of a data structure including one header table and one or more loop table(s), said header table having a preset number of pointing blocks, a first defective bitmap indicating any of the pointing blocks being defective, and a second defective bitmap indicating any of the undated blocks being defective, each of said loop table(s) having a preset number of updated blocks; there being recorded the defect information of said pointing blocks in said header table in each of said anchor information areas, said apparatus comprising:
  reproducing means for reproducing said defect information of said pointing blocks from said information recording medium; and
  controlling means for performing control for comparing the defect state of data of said header table actually reproduced from said information recording medium to said defect information reproduced by said reproducing means, and discontinuing the reproduction processing of the information of said anchor information area including said header table, in case of non-matching between said defect state and said defect information, for shifting to reproduction processing for another one of said anchor information areas, wherein said loop tables include updated blocks that are configured to hold file system location information, and said pointing blocks including information designating which loop table is presently valid.

11. An information reproducing method for reproducing an information recording medium, having recorded thereon the information of a plurality of anchor information areas, each being of a data structure including one header table and one or more loop table(s), said header table having a preset number of pointing blocks, a first defective bitmap indicating any of the pointing blocks being defective, and a second defective bitmap indicating any of the updated blocks being defective, each of said loop table(s) having a preset number of updated blocks; there being recorded the defect information of said pointing blocks in said header table in each of said anchor information areas, said method comprising:
  a reproducing step of reproducing said defect information of said pointing blocks from said information recording medium; and
  a controlling step of performing control for comparing the defect state of data of said header table actually reproduced from said information recording medium to said defect information reproduced by said reproducing means, and discontinuing the reproduction processing of the information of said anchor information area including said header table, in case of non-matching between said defect state and said defect information, for shifting to reproduction processing for another one of said anchor information areas, wherein said loop tables include updated blocks that are configured to hold file system location information, and said pointing blocks including information designating which loop table is presently valid.

12. A program storage medium having stored thereon a computer-readable program for an information reproducing apparatus for reproducing an information recording medium, having recorded thereon the information of a plurality of anchor information areas, each being of a data structure including one header table and one or more loop table(s), said header table having a preset number of pointing blocks, a first defective bitmap indicating any of the pointing blocks being defective, and a second defective bitmap indicating any of the updated blocks being defective, each of said loop table(s) having a preset number of updated blocks; there being recorded the defect information of said pointing blocks in said header table in each of said anchor information areas, said program comprising:

a reproducing step of reproducing said defect information of said pointing blocks from said information recording medium; and a controlling step of performing control for comparing the defect state of data of said header table actually reproduced from said information recording medium to said defect information reproduced by said reproducing means, and discontinuing the reproduction processing of the information of said anchor information area including said header table, in case of non-matching between said defect state and said defect information, for shifting to reproduction processing for another one of said anchor information areas, wherein said loop tables include updated blocks that are configured to hold file system location information, and said pointing blocks including information designating which loop table is presently valid.

13. A computer readable medium with computer instructions therein that when executed by a processor implement steps comprising:

said computer controlling an information reproducing apparatus for reproducing an information recording medium, having recorded thereon the information of a plurality of anchor information areas, each being of a data structure including one header table and one or more loop table(s), said header table having a preset number of pointing blocks, a first defective bitmap indicating any of the pointing blocks being defective, and a second defective bitmap indicating any of the updated blocks being defective, each of said loop table(s) having a preset number of updated blocks; there being recorded the defect information of said pointing blocks in said header table in each of said anchor information areas, said steps comprising:

a reproducing step of reproducing said defect information of said pointing blocks from said information recording medium; and a controlling step of performing control for comparing the defect state of data of said header table actually reproduced from said information recording medium to said defect information reproduced by said reproducing means, and discontinuing the reproduction processing of the information of said anchor information area including said header table, in case of non-matching between said defect state and said defect information, for shifting to reproduction processing for another one of said anchor information areas, wherein said loop tables include updated blocks that are configured to hold file system location information, and said pointing blocks including information designating which loop table is presently valid.

14. An information reproducing apparatus for reproducing an information recording medium, having recorded thereon the information of a plurality of anchor information areas, each being of a data structure including one header table and one or more loop table(s), said header table having a preset number of pointing blocks, a first defective bitmap indicating any of the pointing blocks being defective, and a second defective bitmap indicating any of the updated blocks being defective, each of said loop table(s) having a preset number of updated blocks; there being recorded the defect information of said updated blocks in a currently effective header table in each of said anchor information areas, said apparatus comprising:

reproducing means for reproducing the defect information of said updated blocks of a currently effective loop table, from said information recording medium; and controlling means for performing control for comparing the defect state of data of said header table actually reproduced from said information recording medium to said defect information reproduced by said reproducing means, discontinuing the reproduction processing of the information of said anchor information area including said loop table, in case of non-matching between said defect state and said defect information, for shifting to reproduction processing for another one of said anchor information areas, wherein said loop tables include updated blocks that are configured to hold file system location information, and said pointing blocks including information designating which loop table is presently valid.

15. An information reproducing method for reproducing an information recording medium, having recorded thereon the information of a plurality of anchor information areas, each being of a data structure including one header table and one or more loop table(s), said header table having a preset number of pointing blocks, a first defective bitmap indicating any of the pointing blocks being defective, and a second defective bitmap indicating any of the updated blocks being defective, each of said loop table(s) having a preset number of updated blocks; there being recorded the defect information of said updated blocks in a currently effective header table in each of said anchor information areas, said method comprising:

a reproducing step of reproducing the defect information of said updated blocks of a currently effective loop table, from said information recording medium; and a controlling step of performing control for comparing the defect state of data of said header table actually reproduced from said information recording medium to said defect information reproduced by said reproducing means, discontinuing the reproduction processing of the information of said anchor information area including said loop table, in case of non-matching between said defect state and said defect information, for shifting to reproduction processing for another one of said anchor information areas, wherein said loop tables include updated blocks that are configured to hold file system location information, and said pointing blocks including information designating which loop table is presently valid.

16. A program storage medium having stored thereon a computer-readable program for an information reproducing apparatus for reproducing an information recording medium, having recorded thereon the information of a plurality of anchor information areas, each being of a data structure including one header table and one or more loop table(s), said header table having a preset number of pointing blocks, a first defective bitmap indicating any of the pointing blocks being defective, and a second defective bitmap indicating any of the updated blocks being defective, each of said loop table(s) having a preset number of updated blocks; there being recorded the defect information of said updated blocks in a currently effective header table in each of said anchor information areas, said program comprising:

a reproducing step of reproducing the defect information of said updated blocks of a currently effective loop table, from said information recording medium; and a controlling step of performing control for comparing the defect state of data of said header table actually reproduced from said information recording medium to said defect information reproduced by said reproducing means, discontinuing the reproduction processing of the information of said anchor information area including said loop table, in case of non-matching between said defect state and said defect information, for shifting to reproduction processing for another one of said anchor information areas, wherein said loop tables include updated blocks that are configured to hold file system location information, and said pointing blocks including information designating which loop table is presently valid.

17. A computer readable medium with computer instructions therein that when executed by a processor implement steps comprising:

said computer controlling an information reproducing apparatus for reproducing an information recording medium, having recorded thereon the information of a plurality of anchor information areas, each being of a data structure including one header table and one or more loop table(s), said header table having a preset number of pointing blocks, a first defective bitmap indicating any of the pointing blocks being defective, and a second defective bitmap indicating any of the updated blocks being defective, each of said loop table(s) having a preset number of updated blocks; there being recorded the defect information of said updated blocks in a currently effective header table in each of said anchor information areas, said program comprising:

a reproducing step of reproducing the defect information of said updated blocks of a currently effective loop table, from said information recording medium; and a controlling step of performing control for comparing the defect state of data of said header table actually reproduced from said information recording medium to said defect information reproduced by said reproducing means, discontinuing the reproduction processing of the information of said anchor information area including said loop table, in case of non-matching between said defect state and said defect information, for shifting to reproduction processing for another one of said anchor information areas, wherein said loop tables include updated blocks that are configured to hold file system location information, and said pointing blocks including information designating which loop table is presently valid.

* * * * *